(12) United States Patent
Holland

(10) Patent No.: US 9,332,303 B2
(45) Date of Patent: May 3, 2016

(54) SYSTEM AND METHOD FOR DELIVERING COMPANION CONTENT

(71) Applicant: Jerremy Holland, Los Altos Hills, CA (US)

(72) Inventor: Jerremy Holland, Los Altos Hills, CA (US)

(73) Assignee: APPLE INC., Cupertino, CA (US)

( * ) Notice: Subject to any disclaimer, the term of this patent is extended or adjusted under 35 U.S.C. 154(b) by 30 days.

(21) Appl. No.: 14/275,760

(22) Filed: May 12, 2014

(65) Prior Publication Data

US 2014/0337902 A1 Nov. 13, 2014

Related U.S. Application Data

(63) Continuation of application No. 13/149,798, filed on May 31, 2011, now Pat. No. 8,763,060.

(60) Provisional application No. 61/363,275, filed on Jul. 11, 2010.

(51) Int. Cl.
| | |
|---|---|
| *H04N 7/173* | (2011.01) |
| *H04N 21/433* | (2011.01) |
| *H04N 21/41* | (2011.01) |
| *H04N 21/43* | (2011.01) |
| *H04N 21/4363* | (2011.01) |
| *H04N 21/4725* | (2011.01) |
| *H04N 21/478* | (2011.01) |
| *H04N 21/81* | (2011.01) |
| *H04N 21/858* | (2011.01) |
| *H04L 29/06* | (2006.01) |
| *H04N 21/438* | (2011.01) |
| *H04N 21/61* | (2011.01) |

(52) U.S. Cl.
CPC ........ *H04N 21/4333* (2013.01); *H04L 65/4084* (2013.01); *H04N 7/173* (2013.01); *H04N 21/4126* (2013.01); *H04N 21/43* (2013.01); *H04N 21/4305* (2013.01); *H04N 21/4307* (2013.01); *H04N 21/438* (2013.01); *H04N 21/43637* (2013.01); *H04N 21/4725* (2013.01); *H04N 21/47815* (2013.01); *H04N 21/6125* (2013.01); *H04N 21/812* (2013.01); *H04N 21/8133* (2013.01); *H04N 21/8586* (2013.01)

(58) Field of Classification Search
CPC .................................................. H04N 21/4126
USPC ......................................................... 725/133
See application file for complete search history.

(56) References Cited

U.S. PATENT DOCUMENTS

| | | | |
|---|---|---|---|
| 5,668,591 A | * | 9/1997 | Shintani .................... G06F 8/61 348/734 |
| 5,818,441 A | | 10/1998 | Throckmorton et al. |
| 6,018,768 A | | 1/2000 | Ullman et al. |
| 6,130,726 A | | 10/2000 | Darbee et al. |
| 6,263,505 B1 | | 7/2001 | Walker et al. |
| 6,326,982 B1 | | 12/2001 | Wu et al. |
| 6,349,410 B1 | | 2/2002 | Lortz |

(Continued)

FOREIGN PATENT DOCUMENTS

WO    WO 2010/022000      2/2010

*Primary Examiner* — Dominic D Saltarelli
(74) *Attorney, Agent, or Firm* — Adeli LLP

(57) ABSTRACT

A system and method for providing companion content on a device that downloads content associated with a media presentation playing on a media player and displays the downloaded content at times synchronized to time-offsets (from the start of the program) of the presentation by signals from the media player.

19 Claims, 26 Drawing Sheets

(56) References Cited

U.S. PATENT DOCUMENTS

| | | |
|---|---|---|
| 7,120,871 B1 | 10/2006 | Harrington |
| 7,975,062 B2 | 7/2011 | Krikorian et al. |
| 8,763,060 B2 | 6/2014 | Jerremy |
| 2002/0122137 A1 | 9/2002 | Chen et al. |
| 2002/0162120 A1 | 10/2002 | Mitchell |
| 2004/0003398 A1 | 1/2004 | Donian et al. |
| 2004/0117840 A1 | 6/2004 | Boudreau et al. |
| 2007/0124781 A1 | 5/2007 | Casey et al. |
| 2007/0154190 A1 | 7/2007 | Gilley et al. |
| 2007/0226761 A1 | 9/2007 | Zalewski et al. |
| 2008/0004095 A1* | 1/2008 | Hayasaka ............... A63F 13/10 463/1 |
| 2009/0254861 A1 | 10/2009 | Seetharamakrishnan et al. |
| 2012/0114313 A1* | 5/2012 | Phillips ............ G11B 20/10527 386/298 |

* cited by examiner

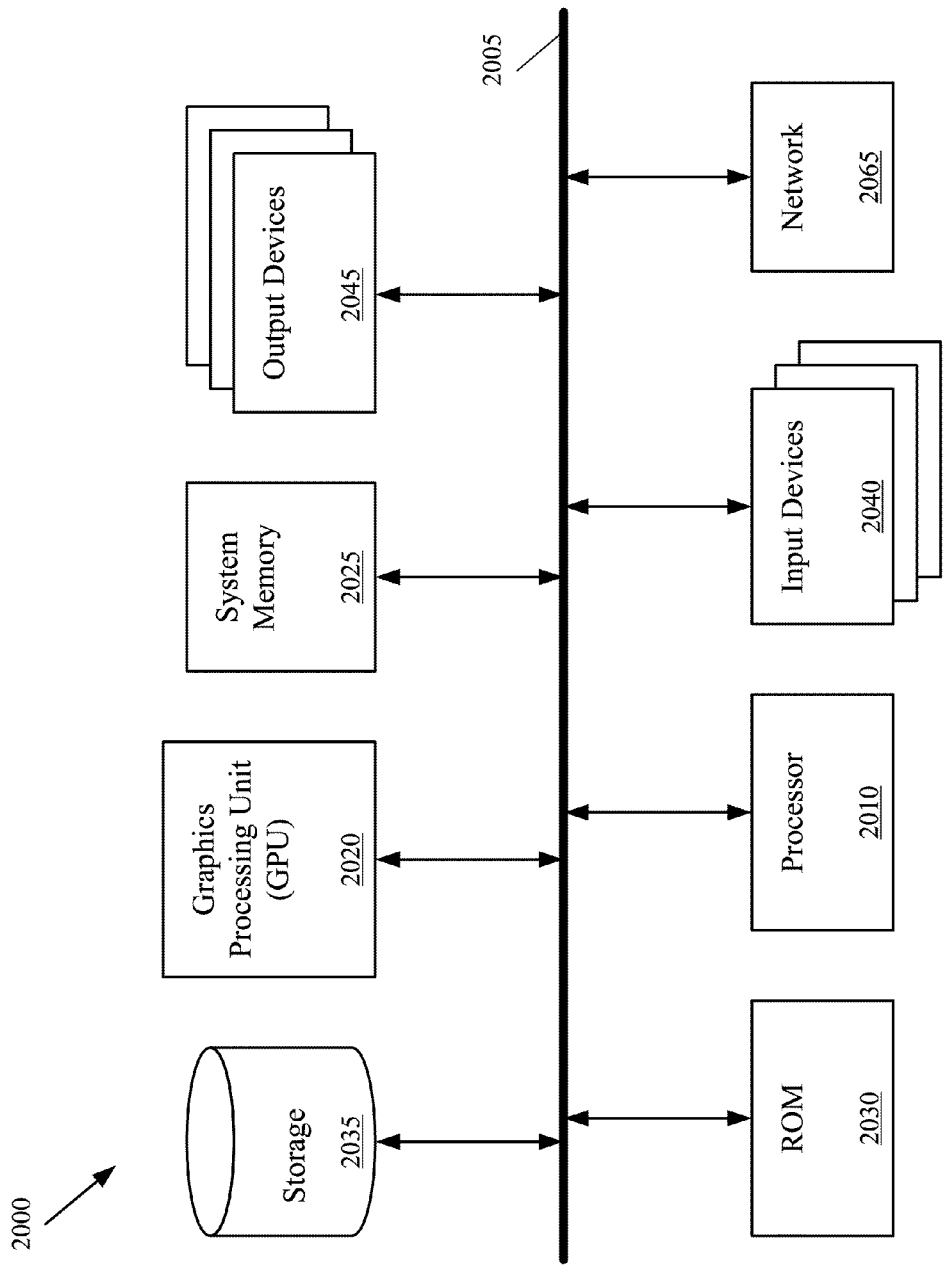

SYSTEM AND METHOD FOR DELIVERING COMPANION CONTENT

CLAIM OF BENEFIT TO PRIOR APPLICATIONS

This application claims the benefit of U.S. Provisional Patent Application 61/363,275, entitled "System and Method for Delivering Companion Content," filed Jul. 11, 2010. The content of U.S. Provisional Patent Application 61/363,275 is hereby incorporated by reference.

BACKGROUND

Media presentations (e.g., movies, television programs, slideshows, etc.) can contain a wealth of information, including images of actors, audio sound tracks, images of clothing and other goods. Information about the things seen and heard in a media presentation is not always discernable from the media presentation itself as it is playing. For example, the name of a particular song playing at a specific time in a movie may not be readily determined at the time it plays in the movie. Some viewers of a media presentation may want to have immediate access to more information about whatever images or sounds are playing in the media presentation at a given time.

In the existing art, there is no simple way to automatically link an external device to information about a particular part of a media presentation. Currently, some general information about a movie can be tracked down via a web search, but the specific products displayed and sound track songs played at particular times in the movie can rarely be found easily. For example, movies that list soundtrack songs in their end credits do not provide the specific times that these songs were played. Therefore, even if the songs are listed in order of appearance in the movie, one would have to rewatch the movie from the beginning to identify the songs that preceded the desired song. Furthermore, TV programs have limited time for end credits and often entirely omit any listing of sound track songs. Some systems provide locations to find information in media presentations, but these must be included before the media presentation leaves the control of the producer of the media presentation.

The producers of shows (e.g., movies, television shows, webisodes, straight to digital storage medium productions, online videos, etc.) often want to provide information to their viewers about items within the shows. Currently, such producers place advertisements of products within the context of the show itself. Such advertisements are called "product placements". These product placements are used as an alternative to separate commercial breaks. For television, and other media with commercial interruptions, product placements elude the commercial skipping and fast-forwarding features of recording devices such as digital video recorders, VCRs and DVD recorders.

When product placement is done well, such placements can enhance the viewer's experience. For example, when the script calls for a character to drink a canned beverage, the character may drink a beverage from a can with a distinct, recognizable color scheme or logo. Similarly, if a movie hero has to be thrown into an electronic billboard, it might as well be a billboard of a well known company that is sponsoring the movie. By using a product that the viewer would naturally expect to see in that situation rather than a product with a made up logo or a generic label such as "soda", the audience's suspension of disbelief becomes easier and the show becomes more enjoyable.

In contrast, the producers of shows can highlight products in an obtrusive manner. For example, a show could have a jarring non sequitur in which a character within the show suddenly praises the product in a manner that seems unnatural to the character or the situation. A direct mention of the product is the only effective means of product placement for products that are not readily identifiable while in use.

Accordingly, product placement for goods and services whose origin is not obvious from the image of the product itself creates a dilemma for the producers. They must interrupt the flow of the show to identify the goods sufficiently for an audience member to find and purchase the product. This can destroy the suspension of disbelief and make the show less enjoyable for audience members that are not interested in the product. A less enjoyable show can lead to lower sales of the show, lower ratings, etc. Furthermore, an overly obtrusive product placement can have the opposite of the intended effect. A viewer might resent the product for "ruining" the show and be less likely to purchase it than he was before. Similarly, some media producers have tried to overcome this problem by adding pop-up ads as overlays on some media presentations. The outcome, however, has not been very successful. The reason is that the pop-up ads can become so obtrusive and distractive that they render a reversed result and the viewer decides to boycott the product instead of showing interest in it.

As for the viewer who wishes to purchase a product placed in a show, he might not be able to get the product. The viewer would first have to identify the item, and then track down a seller of that item in order to purchase it. In the meantime, he would not know the price range of the item. For example, a viewer might admire the curtains in a scene, but assume that they would cost too much to be worth buying. Such a viewer would not bother to track them down and would never realize that the same curtains could be purchased for a price that he could afford.

The media producer may also want to provide non-product related information to interested viewers, such as storyboards of the media presentation or more information on the topic of the media presentation. Accordingly, there is a need for a better way to find content that relates to content shown at specific times in a media presentation.

BRIEF SUMMARY

Some embodiments provide a companion content device (sometimes called a "client") that downloads content associated with a media presentation playing on a media player and displays the downloaded content at times synchronized to time-offsets (measured from the start of the presentation) of the presentation by signals from a media player. Some embodiments include the media player as well as the companion content device.

In some embodiments, the companion content device is used in the same room with a TV set or other display device that displays a media presentation (e.g., a show). The media presentation includes an embedded resource location (e.g., a URL) unique to that media presentation (e.g., www.media-companion-content.com/movie/movie23512). All URLs herein are provided only as examples to illustrate some embodiments. The use of any URL in use by any entity is unintended and strictly co-incidental. The media player that plays the show (i.e., sends the show to the TV set or other display device) broadcasts that URL in a limited area (e.g., the room where the media presentation is playing on the TV set or other display device). In some embodiments, the media player sends the URL together with other information (e.g., a time-offset synchronization signal, timecode, transport changes, etc.) to companion content devices through multicasting. One of the benefits of multicasting instead of broadcasting in some such embodiments is that it would allow only clients interested in the companion content to fully process the network packets thus reducing/eliminating network impact on network devices that are not participating in the communication at all. In addition, with a multicast, clients can "subscribe" to a multicast address and only those clients that have subscribed will get the traffic such as the program URL. Unless otherwise specified, all embodiments described in this specification that use broadcasting are also applicable to multicasting and vice versa.

The companion content device receives the URL from the media player and uses the URL to automatically download a list of URLs where companion content is found. The list includes associated times at which to display each item of companion content. The time is relative to the time-offset of the show. For example, an item on the list could specify that at 29 minutes, 10 seconds into the show, the companion content device should display content from URL:www.example.net/advertisement1. The companion content device displays each content item at the time indicated in the list. In some embodiments, the device caches the content before it is needed. In some embodiments, the displayed content includes links to other content. Some embodiments allow live interaction with the companion device (e.g., live voting, test taking, etc.). Examples of content to be displayed are ads for items in the show, links to buy a song played in the show, storyboards of the show, a movie/TV database entry for the show or specific actor in a scene, etc. Although the above description is in terms of a device, some embodiments include the entire system for providing companion content. Some embodiments include computer readable media storing programs with instructions to make a general purpose handheld device perform the described functions.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 20 conceptually illustrates a computer system with which some embodiments of the invention are implemented.

DETAILED DESCRIPTION

In the following description, numerous details are set forth for purpose of explanation. However, one of ordinary skill in the art will realize that the invention may be practiced without the use of these specific details. For instance, some of the examples illustrate specific handheld devices. One of ordinary skill in the art will recognize that different handheld devices can replace this specific handheld device without departing from the invention.

I. Overview

Some embodiments provide a system for delivering content associated with a media presentation to devices that are auxiliary to the devices that play and display the media presentation. The auxiliary content devices are referred to herein as "companion content devices", "companion devices", or "clients". The associated content is referred to herein as "companion content".

Figure 1:
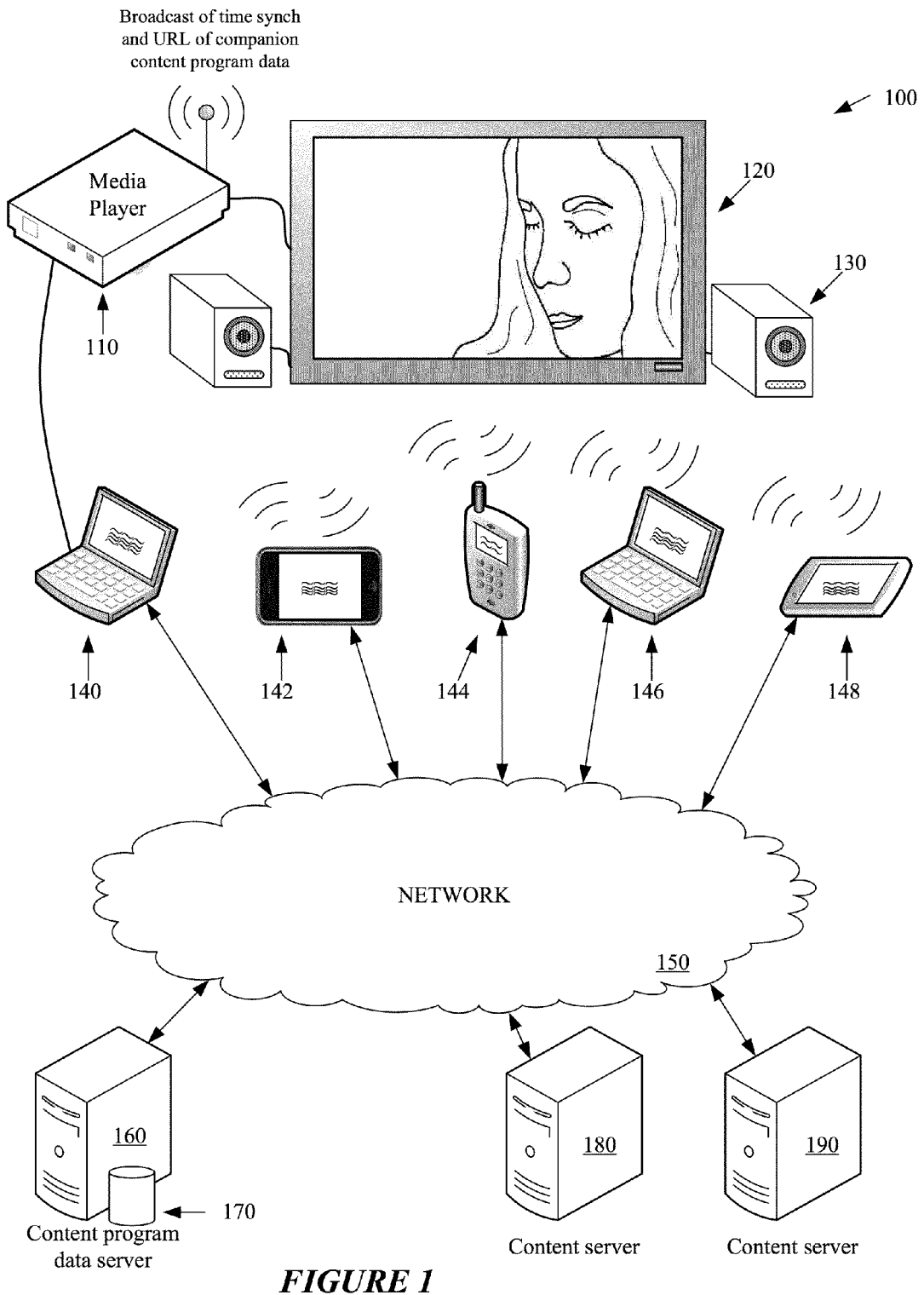
FIG. 1 illustrates a companion content system of some embodiments.

FIG. 1 illustrates a companion content system 100 of some embodiments. The companion content system includes multiple components that operate in relatively close proximity (e.g., in the same room, or within 200 feet, or within 50 feet). The figure also illustrates some external devices that interact with the companion content system 100. The external sources can be accessed in different ways by different companion content devices. FIG. 1 includes a media player 110, a display device 120, speakers 130, companion content devices 140-148, network 150, computer server 160 with database 170 and computer servers 180 and 190. Media player 110 delivers analog and/or digital data to a display device. Display device 120 accepts analog and/or digital data and displays visual portions of the data as visual images. Speakers 130 play audio portions of the data. In some embodiments, the media player 110, display device 120, and speakers 130 are integrated on a single device such as a computer, a laptop, an enhanced television, or an enhanced cell phone. In some such embodiments this media player device can also function as a companion content device (similar to any one of the companion content devices 140-148) simultaneously. Some embodiments use a variety of different companion devices 140-148. Here, the embodiment uses laptops/netbooks 140 and 146, an enhanced cell phone 142, a standard cell phone 144, and a pad device 148. Although the pad device 148 is not depicted with a stylus and the pad devices of some embodiments work with finger touches or other means, one of ordinary skill in the art will understand that pad devices of the same embodiments or other embodiments might have a stylus as a means for inputting data to the pad devices. Companion content devices 140-148 receive and display data related to the media presentation at times synchronized to the playback of the media presentation. Network 150 conceptually illustrates one or more networks through which the various companion devices 140-148 can connect to computer servers 160, 180, and 190. Computer server 160 provides the companion devices 140-148 with data from the database 170. Database 170 stores data about a plurality of media presentations. Computer servers 180 and 190 provide the companion devices with companion content. In some embodiments, computer servers 160, 180, and 190 are integrated on one machine that provides the companion devices with both companion data and companion content.

The media player 110 sends audio and/or video data for playing the media presentation to the display 120. While the media presentation is playing, the media player 110 of some embodiments sends out time synchronization signals to identify what part of the media presentation is playing (the time-offset). The time synchronization signals from the media player 110 allow the companion content devices 140-148 to play companion content at time-offsets synchronized with the media presentation.

In some embodiments, companion content is downloaded from sources external to the area near media player 110. In some such embodiments, the media player 110 broadcasts resource location data (e.g., a URL) to any companion content device 140-148 within range. In some other embodiments, the resource location data could also reference the media player which would instruct the client to request content program data and companion content from the media player. For brevity, URL, which stands for "Uniform Resource Locator", will be used herein in place of "resource location data". However, one of ordinary skill in the art will understand that other systems of identifying the location of resources besides URLs can be used in some embodiments. The broadcast URL allows the companion content devices 140-148 to find companion content for that media presentation. Companion content is content designated by the maker of the media presentation (or a third party) as being associated with that particular media presentation. The companion content can be generated by the producers of the media player or by third parties. Different media presentations can have different companion content with different URLs. The companion content devices 140-148 display a particular piece of companion content when the media presentation reaches time-offsets associated with that piece of companion content.

In some embodiments, the companion content devices 140-148 can receive signals from the media player 110 wirelessly or through a wired connection. Some embodiments allow both wired and wireless signals; while other embodiments allow only wired signals from the media player or only wireless signals from the media player. As shown in this figure, companion device 140 receives the signals through a wired connection from the media player 110. Companion devices 142-148 receive the signals from the media player 110 wirelessly.

In some embodiments, the URL broadcast from media player 110 provides a URL to the companion devices 140-148. In some embodiments, the broadcast URL points to companion content program data. Companion content program data in some embodiments is provided as one or more files containing information about the media presentation being played. The file(s) include(s) one or more program channels, each with a set of time-offsets from the start of the program and URLs from which to download content to display at those time-offsets.

The companion content devices 140-148 download companion content program data from the URL over the network 150. In some embodiments, the individual companion content devices 140-148 use different networks from each other. Some companion content devices 140-148 are able to access multiple networks. For example, an enhanced cell phone 142 of some embodiments is able to access the file indicated by the URL through a cellular telephone network as well as a local wireless access network connected to the Internet. In some embodiments, the URL represents a resource (e.g. a file) that is (1) specific to the media presentation being played by media player 110 and (2) accessible through the database 170 on the computer server 160.

When a companion content device (e.g. 140-148) contacts computer server 160, the computer server 160 accesses database 170 to download a set of data associated with the media presentation. The server 160 then sends the set of data to the companion content device. The set of data identifies a set of resource locations and a set of timecodes identifying particular time-offsets. Each resource location in the set is associated with a particular time-offset. The set of resource locations identify one or more files on computer servers 180 and 190. The companion devices 140-148 access the files on computer servers 180 and 190. In some embodiments, if no companion content server can be reached, the media is treated as though it has no companion content. At the associated playback times, the companion content devices 140-148 display the companion content. One of ordinary skill in the art will understand that the set of resource locations may refer to files stored on more or fewer computer servers than are shown in FIG. 1.

Unlike the varied companion content devices illustrated in FIG. 1, the companion content devices illustrated in the following figures are all enhanced cell phones. However, this is merely for ease of illustration. Any of the following embodiments would work with any of the other companion content devices described herein or with other suitable companion content devices. Furthermore, the figures herein are not drawn to scale. Neither the relative sizes nor the aspect ratios of the illustration of any item in any figure should be considered to be a limitation unless otherwise indicated in the description of the item in the specification.

II. Retrieving Companion Content

Figure 2:
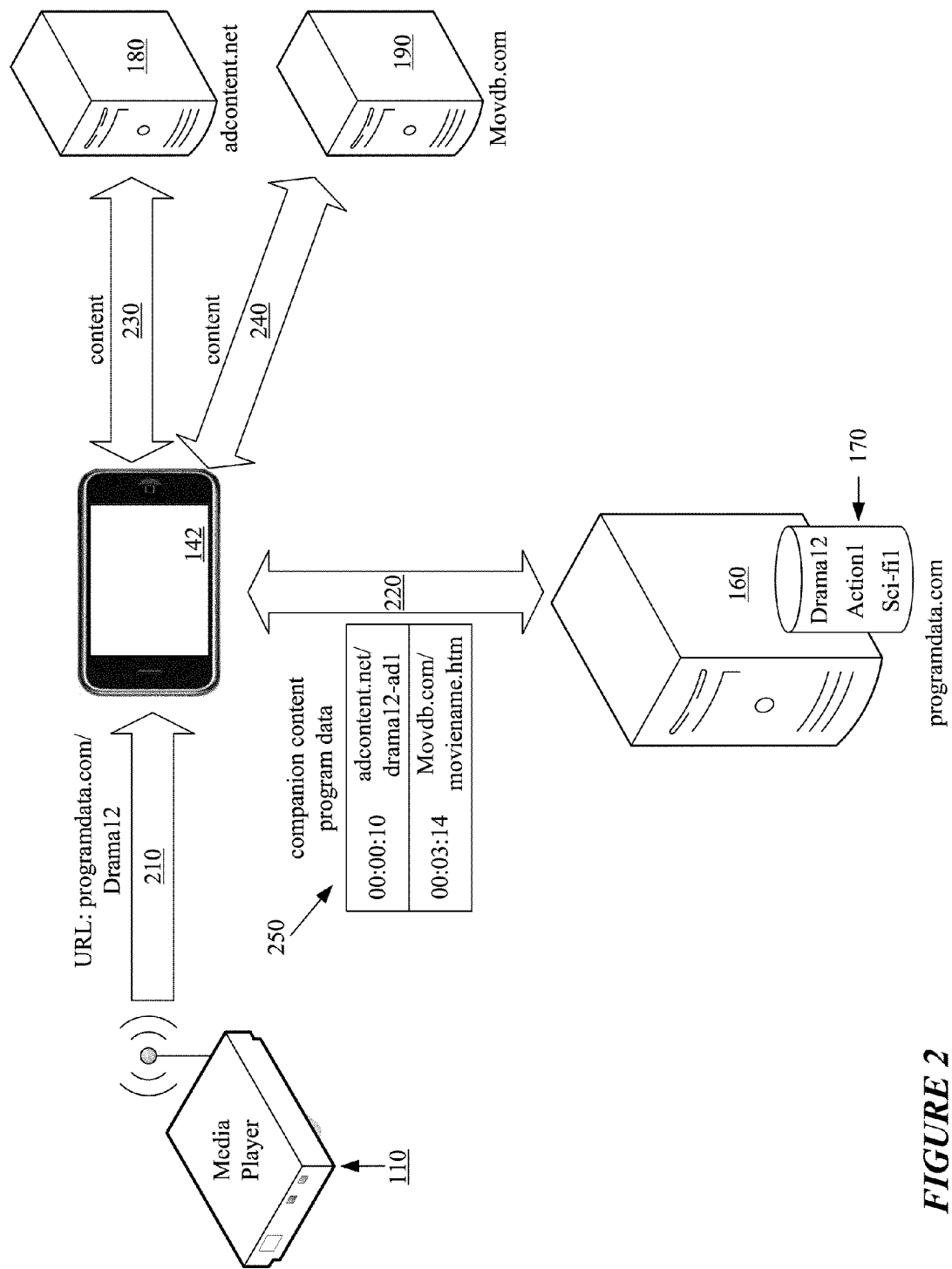
FIG. 2 conceptually illustrates downloading of companion content from computer servers in some embodiments.

As described in relation to FIG. 1, in some embodiments, a media player 110 broadcasts a URL associated with the media presentation. The URL points to an external computer server that provides companion content program data. FIG. 2 conceptually illustrates downloading of companion content from computer servers. This method of retrieving content requires a limited amount of data from the media player 110 and allows revisions of companion content program data without altering the data embedded in the media presentation itself. FIG. 2 includes URL broadcast 210, companion content program data download 220, companion content downloads 230 and 240, and companion content program data 250. The URL broadcast 210 includes a URL that points to the companion content program data 250. The companion content program data download 220 provides the companion content device 142 with the companion content program data 250. The companion content program data 250 includes (1) multiple URLs, each pointing to an item of companion content and (2) a time-offset for each URL that identifies when the content associated with that URL should be displayed on the companion content device 142. The companion content downloads 230 and 240 provide companion content to the companion content device 142.

In the example illustrated in FIG. 2, the media player is playing a dramatic media presentation. In some embodiments, the media presentation contains embedded data that includes a URL. The URL points to a file where the companion content program data 250 is found. In this example, as shown in broadcast 210, the URL points to programdata.com/Drama12. The domain "programdata.com" identifies the address of the domain on which the file resides and "Drama12" identifies the particular file associated with the dramatic media presentation being played by the media player 110. The database 170 contains file "Drama12" and also contains files "Action1" and "Sci-fi1". The server 160 retrieves the "Drama12" file from the database and supplies it to the companion content device 142. The additional files ("Action1" and "Sci-fi1") contain companion content program data for other media presentations and will not be accessed by the companion content device 142 unless the media presentations associated with those files are played in the media player 110 or some other media player in the presence of companion content device 142.

In some embodiments, the server 160 is a central clearinghouse that supplies companion content program data for all media presentations that use a particular companion content system. In some such systems, the media presentation producers provide the companion content program data, but the media player producers provide the servers that supply the companion content program data to the companion content devices. In other embodiments, each of a plurality of media presentation producers provides their own server(s) for their respective media presentations. In some such embodiment, the producer of the media players and/or the companion content devices provides a data format for the content program data to media producers or other parties that run servers. The multiple servers that store the content program data then provide the content program data in the supplied format so that the content program data will be usable by the companion content devices. Some embodiments provide for a central server for multiple producers of media presentations, but also allow media presentation producers to maintain their own separate servers if they choose to do so.

In some embodiments, the URL is sent out in a formatted set of data. Table 1, below, shows an example of pseudocode for a URL broadcast of some embodiments. As table 1 illustrates, in some embodiments, the media player uses a multicast to send the URL together with a time-offset synchronization signal (e.g., <mediaTC>), timecode which could be an identifier of the current actual time (e.g., the Coordinated Universal Time, UTCTime), and transport changes (e.g., play, pause, etc.). In some embodiments, such signals are sent out periodically and/or in response to some change in the status of the media presentation. In some embodiments, the time-offset synchronization signals and the URL broadcast are sent separately, but each is still sent periodically and/or when a transport change occurs.

TABLE 1

```
<?xml version="1.0"?>
<programControl>
    <programURL>http://programdata.com/Drama12</programURL>
    <transportControl>PLAY</transportControl>
    <UTCTime>21:00:17.12</UTCTime>
    <mediaTC>00:00:00:00</mediaTC>
</programControl>
```

The Drama12 file contains the companion content program data 250. In FIG. 2, the companion content program data 250 is shown next to companion content program data download 220 to indicate that the companion content program data 250 is provided in download 220. The companion content program data 250 includes the URLs for two pieces of companion content: "adcontent.net/drama12-ad1" and "Movdb.com/moviename.htm". The first URL is associated with a time-offset of ten seconds. The second URL is associated with a time-offset of three minutes and fourteen seconds. Although the companion content program data 250 includes the URLs for only two pieces of companion content in this example, it will be clear to one of ordinary skill in the art that an actual set of companion content program data would have many more items of companion contents. The companion content device 142 downloads the companion content identified by the URLs in the companion content program data 250. In some embodiments, the companion content device 142 downloads and caches the companion content from the URL before the media presentation reaches the associated time-offset. In some embodiments, the companion content device begins caching companion content as soon as the media presentation is selected, even before the media presentation begins to play. As further described in section IV, below, the companion content device 142 then displays the companion content when the media presentation reaches the time-offsets associated with the respective items of companion content. In the example in FIG. 2, the companion content device 142 would display content from the URL "adcontent.net/drama12-ad1" when the media presentation is at the ten second mark and the companion content device 142 would display content from URL "Movdb.com/moviename.htm" when the media presentation is at the three minutes and fourteen seconds mark.

Table 2, below, contains an example of pseudocode for companion content program data. The table includes metadata identifying the series and the episode of the media presentation. In some embodiments, this metadata can be accessed on the companion content device.

TABLE 2

```
<?xml version="1.0"?>
    <programExtras>
        <programMeta>
            <programURL>http://mde.company.com/d83h7df9</programURL>
                <programInfo>
                <series>Rows</series>
                <season>4</season>
                <episode>CHX05</episode>
                <name>Hysterical </name>
                <persistentID>05D6F42342ED860F</persistentID>
...
            </programInfo>
        </programMeta>
    <programChannel>
        <channelInfo>
            <channelName>Ads</channelName>
            <channelDescription>Content-specific advertisements</channelDescription>
        </channelInfo>
        <programElement>
            <mediaTC>00:00:05:08</mediaTC>
            <contentURL>http://ww.not.com/Rows/images/Rowslogo.png</contentURL>
        </programElement>
        <programElement>
            <mediaTC>00:00:14:14</mediaTC>
            <contentURL>http://www.not.com/rows/ads/club-golfing/</contentURL>
        </programElement>
...
    </programChannel>
    <programChannel>
        <channelInfo>
            <channelName>Storyboards</channelName>
            <channelDescription>Original storyboards that correspond to the action on-
            screen</channelDescription>
        </channelInfo>
        <programElement>
            <mediaTC>00:00:01:08</mediaTC>
            <contentURL>http://www.not.com/CHX05/storyboard/CH01S01.jpg</contentURL>
            <contentDescription>Opening shot</contentDescription>
        </programElement>
        <programElement>
            <mediaTC>00:00:01:14</mediaTC>
            <contentURL>http://www.not.com/CHX05/storyboard/CH01S01.jpg</contentURL>
            <contentDescription>Closeup of Mr. Jones</contentDescription>
        </programElement>
...
    </programChannel>
    <programChannel>
        <channelInfo>
            <channelName>Script</channelName>
            <channelDescription>Script</channelDescription>
        </channelInfo>
        <programElement>
            <mediaTC>00:00:01:00</mediaTC>
            <contentURL>http://ww.not.com/CHX05/script/CH01P01.html</contentURL>
            <contentDescription>Page 1 of the Script</contentDescription>
        </programElement>
        <programElement>
            <mediaTC>00:00:02:14</mediaTC>
            <contentURL>http://ww.not.com/CHX05/script/CH01P02.html</contentURL>
            <contentDescription>Page 1 of the Script</contentDescription>
        </programElement>
    </programChannel>
...
</programExtras>
```

Downloading the companion content program data from a server based on a single URL rather than embedding all URLs of the companion content within a media presentation has tremendous advantages over any currently available system. A server storing a companion content program database allows the companion content program data to be edited at any time. Editing the companion content program data instantly updates which companion content will be displayed when copies of the media presentation are played, including copies that have long since been distributed. Any URLs in the companion content program data that become obsolete can be removed or replaced at the server. The continuing control may result in a production company that would not otherwise be willing to embed companion content to agree to embed the content. For example, a family oriented filmmaker could be assured that a link in the companion content program data would be replaced if the domain name of the link was later purchased by an inappropriate site. Advertisement links could be sold on a continuing basis rather than permanently embedded. For example, one retail company could rent the advertisement space associated with a particular time-offset in the presentation for the first week after the presentation is released and a second retail company could rent the same advertisement space associated with that particular time-offset for the second week after the presentation is released.

In some embodiments, the companion content program data includes more data than just the location of the companion content URL(s). For example, in some embodiments, the companion content program data includes data that determines the size and position of the window in which the content will be displayed. In some embodiments, the companion content program data includes instructions to open a new item of companion content in a separate window from an already displayed item of companion content rather than replacing the previous companion content. In some embodiments, the companion content program data or downloaded companion content contains instructions that cause the companion content device to send a transport control signal to the media player, such as a signal to pause the presentation when a particular companion content is displayed on the companion content device.

The companion content program data may include instructions that are conditional. For example, the companion content program data may direct the companion content device to pause the media player if the realtime date is between two specific dates during which voting on the talent show is viable (in other words, only pause the presentation if the vote would count, not if the presentation is an old re-run).

Figure 3:
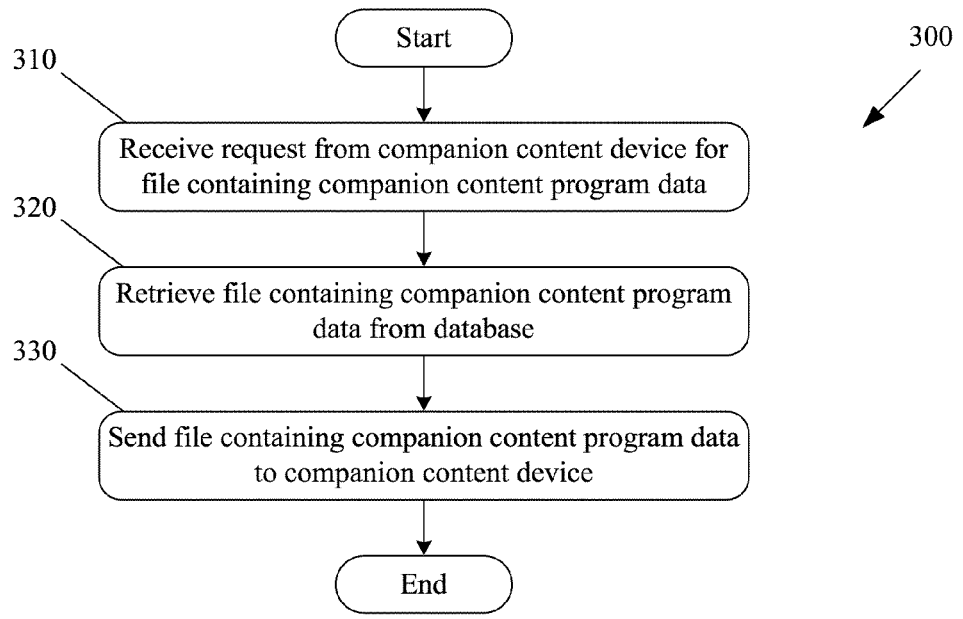
FIG. 3 illustrates a process performed by a server of some embodiments for providing companion content program data to companion content devices.

FIG. 3 illustrates a process performed by servers of some embodiments for providing companion content program data to companion content devices. The process 300 receives (at 310) a request from a companion content device to provide one or more files containing companion content data. As described above, in some embodiments this request is a request from a companion content device to access a particular URL. The process retrieves (at 320) the file from a database of files containing companion content program data for multiple media presentations. The process sends (at 330) the retrieved file to the companion content device. The process 300 then ends.

Figure 4:
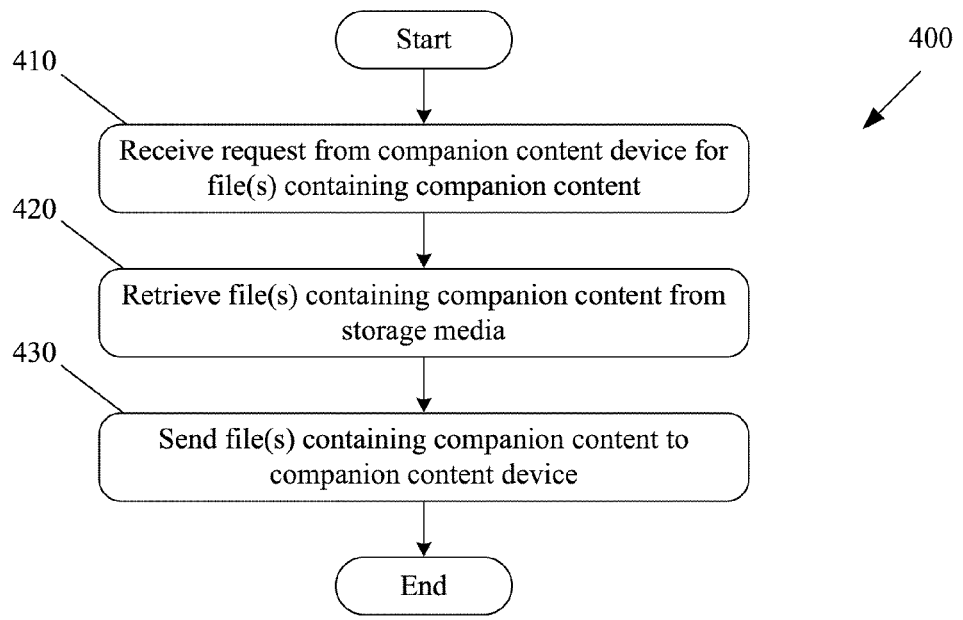
FIG. 4 illustrates a process performed by a server of some embodiments for providing companion content to companion content devices.

FIG. 4 illustrates a process performed by some servers for providing companion content to companion content devices. Process 400 receives (at 410) one or more requests from a companion content device to provide one or more files containing companion content. As described above, in some embodiments this request is a request from a companion content device to access a particular URL. The process retrieves (at 420) the file(s) from storage media accessible to the server (e.g., hard drives of the server). The process sends (at 430) the retrieved file(s) to the companion content device. The process 400 then ends.

III. Companion Content Device

In some embodiments, the companion content devices download companion content program data, download companion content, and display the companion content at time-offsets specified by the companion content program data. Some such embodiments include counters that measure elapsed time since the start of a media presentation. In some embodiments, these counters do not merely start at zero and continue until stopped, but instead they synchronize and resynchronize with the time-offset of the media presentation that is playing.

Figure 5:
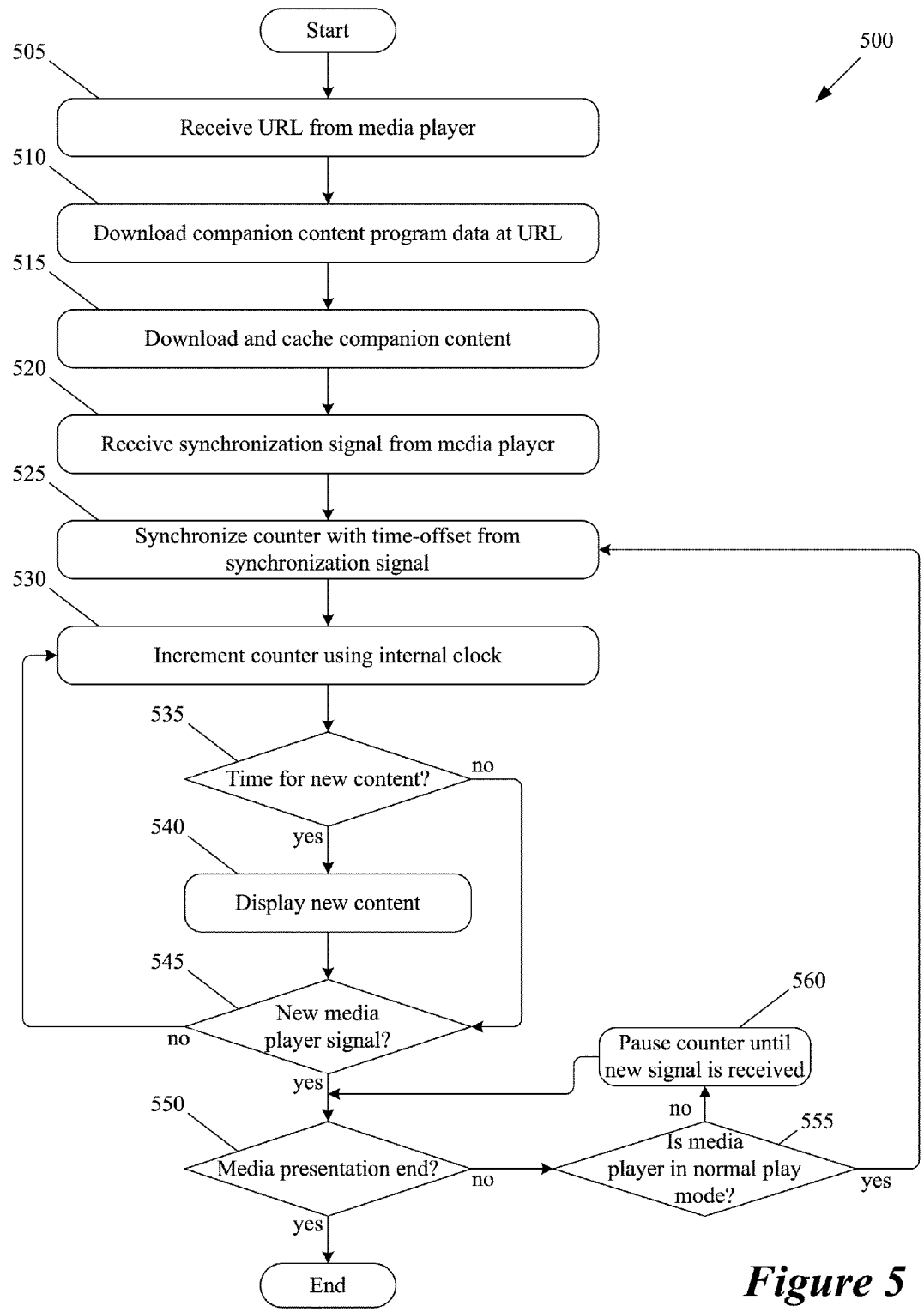
FIG. 5 conceptually illustrates a process performed by a companion content device of some embodiments for downloading and displaying companion content.

FIG. 5 conceptually illustrates a process 500 performed by a companion content device of some embodiments for downloading and displaying companion content. The process 500 includes synchronization of a counter of the companion content device with the time-offset of a media presentation. The process 500 is a basic process that does not show all of the possible actions of the companion content device. For example, the process 500 does not describe user interactions with the companion content. One of ordinary skill in the art will understand that the actual processes performed by companion content devices of some embodiments are considerably more detailed and complicated. Additional features of the companion content devices of some embodiments are described in other sections.

Process 500 begins when the companion content device receives (at 505) a URL from a media player. In some embodiments, the media player periodically sends out a signal that includes a URL associated with the particular media presentation that the media player is playing. As described above, the URL identifies the location of a set of companion content program data that includes URLs and associated time-offsets for the companion content of the particular media presentation. The process 500 downloads (at 510) the companion content program data from the domain and file location specified by the received URL.

The process then downloads and caches (at 515) the companion content. In some embodiments, the downloading and caching of the companion content takes place shortly after the companion content program data is downloaded. In some embodiments the downloading and caching proceeds in parallel with other operations of the process 500. For example, the companion content device of some embodiments downloads and caches companion content that is scheduled for later time-offsets while displaying companion content scheduled for earlier time-offsets. In some embodiments, the downloading and caching continues until either all available cache memory is full or until all companion contents have been cached. In some embodiments, the companion content device caches companion content which is scheduled to be displayed within some set amount of lead time (e.g., within ten minutes of the current offset). For example, in some embodiments with a 10 minute lead time, the companion content device would wait until time-offset 05:12 to download and cache an item of companion content scheduled to be displayed at a time-offset of 15:12. In some other embodiments, the companion content device manages a memory or event-based buffer, caching the next certain number of companion contents which are scheduled to be displayed.

Process 500 continues when the companion content device receives (at 520) a synchronization signal from the media player. In some embodiments, the media player periodically sends out a signal indicating the current time-offset of the media presentation. In some embodiments, a new synchronization signal is sent out whenever a media player resumes normal playing after the media presentation is paused, fast forwarded, rewound, and/or put in some other mode that interrupts the normal playing of the media presentation. In some embodiments, when the media player is in a normal play mode it steadily plays the media presentation, and steadily increments the time-offset at a rate of one time-offset second per second of real time. In some embodiments, the time synchronization signal always includes the URL identifying the location of the companion content program data. In other embodiments, some time synchronization signals include the URL and other time synchronization signals do not include the URL. In still other embodiments, the URL is sent out repeatedly, but independently of the time synchronization signals.

The companion content device then synchronizes (at 525) a counter of the companion content device with the time-offset indicated by the received synchronization signal. The counter keeps track of the time-offset for the companion content device. The companion content device then increments (at 530) its counter that tracks the time-offset. In other words, after the companion content device synchronizes the counter to the time-offset provided by the synchronization signal, the companion content device keeps track of time on the counter by using an internal clock of the companion content device until the next synchronization signal (or other signal that affects the time-offset) is received. In some embodiments, the incrementing of the counter based on an internal clock of the companion content device allows the companion content device to identify time-offsets between synchronization signals. For example, in some embodiments, the media player sends out a synchronization signal once every five minutes (e.g., at 0 minutes, 5 minutes, 10 minutes, etc.). The counter of some embodiments keeps track of the time-offsets between the synchronization signals so that if the companion content program data called for a piece of companion content to be displayed at 3 minutes and 14 seconds, the companion content device could display it at that time even though the media player did not provide a synchronization signal at that exact time.

The process 500 determines (at 535) whether the time to display new companion content has arrived. In some embodiments, the companion content device determines whether the time has arrived by comparing the time-offset of the counter with the time-offset of the next item of companion content identified in the companion content program data. If the process determines (at 535) that new companion content is scheduled for the current time, then the companion content device displays (at 540) the new content (assuming nothing overrides the schedule, see section V et seq. for some exceptions). The process then moves on to operation 545. If the process 500 determines (at 535) that no new companion content is scheduled for the current time-offset, then the process 500 skips operation 540 and moves on to operation 545 directly.

The process 500 determines (at 545) whether the companion content device has received a new media player signal. In some embodiments, new media player signals include new time synchronization signals. In some embodiments, the companion content device also receives signals from the media player that indicate that the media presentation has paused, ended, is being fast forwarded, reversed, or is otherwise not providing a steady progression of time-offsets in a normal playing mode. If the process determines (at 545) that no new signal has been received, then the process loops back to increment (at 530) the counter again. If the process determines (at 545) that a new signal has been received, then the process determines (at 550) whether the new signal indicates the end of the media presentation.

If the process determines (at 550) that the new signal does not indicate the end of the media presentation, then the process determines (at 555) whether the signal indicates that the media presentation is in a normal play mode. In some embodiments, when the media player is in a normal play mode, the media player sends out time synchronization signals that include information that indicates that the media player is in a normal play mode. In some embodiments, a new time synchronization signal by itself, without other information, indicates that the media player is in a normal play mode. As mentioned above, in some embodiments, the media player signal sometimes includes information that the media player is being fast forwarded, paused, reversed, or is otherwise not in a normal play mode. In some such embodiments, when the process 500 determines (at 555) that the media player is not in a normal play mode, the companion content device pauses (at 560) the counter until a new signal is received. The companion content device of some embodiments then enters a loop from 560 to 550 to 555 back to 560 until a signal is received that indicates the end of the media presentation (determined at 550) or that normal play mode has resumed (determined at 555). When the media player of some embodiments resumes normal play, the media player sends a signal that includes a time synchronization signal indicating the current time-offset. The signal indicates that normal play has resumed. In some embodiments, the time synchronization signal itself, without a specific "play resumed" signal, indicates that normal play has resumed. In some embodiments, an additional "play resumed" signal that indicates that normal play has resumed is sent with the time synchronization signal. When the process determines (at 555) (e.g., after receiving the new signal from the media player) that normal play mode has resumed, the process loops back to synchronize (at 525) the counter using the time synchronization data included in the signal that indicated that normal play mode had resumed and unpauses the counter.

If the process determines (at 550) that a signal from the media player indicates the end of the media presentation, then the process 500 ends. The end of the media presentation means that either the media presentation has reached the end of its run time or has otherwise been stopped.

Although FIG. 5 illustrates the loop 530-545 in order for companion content device to display new companion content and to wait for a new media player signal, in some embodiments, a blocking mode is used instead. In some such embodiments, a timer is set to go off at the interval for the display of the next piece of companion content. The process then block-waits for either a new control message to come in or for the timer to expire, in which case the next companion content would be displayed.

IV. Displaying Companion Content

Figure 6A:
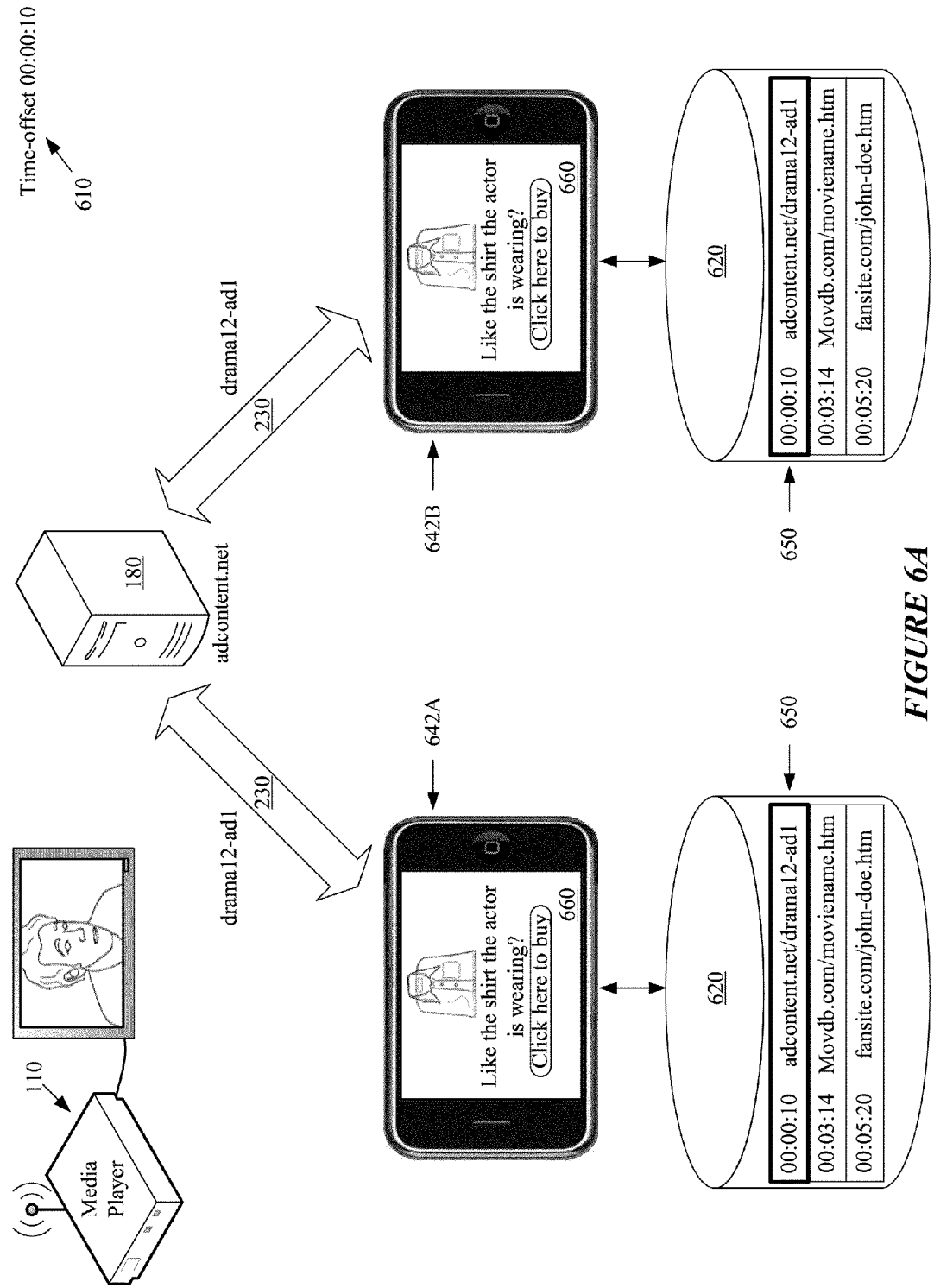
FIGS. 6A-6B illustrate the display of companion content at two time-offsets.
Figure 6B:
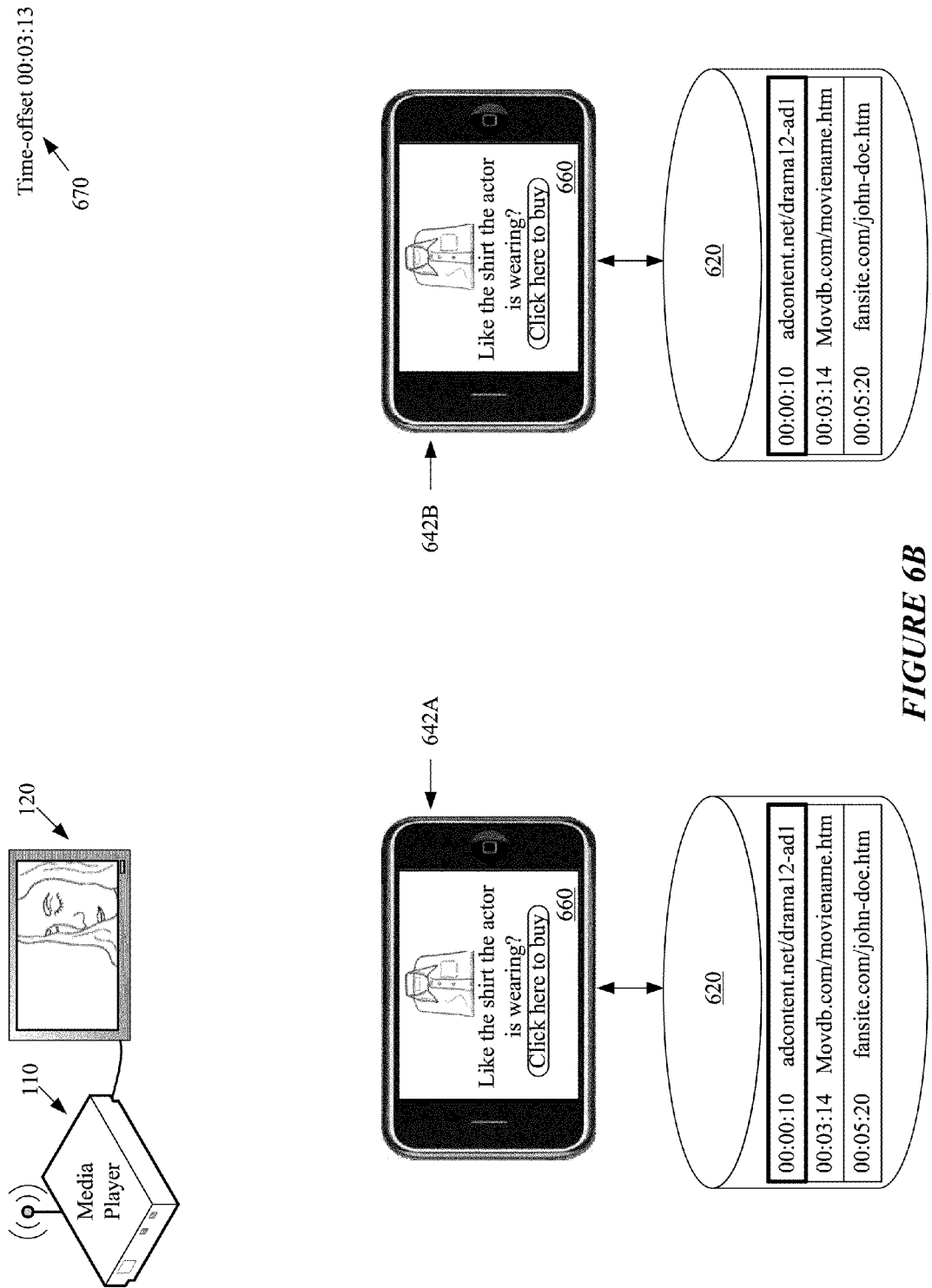

FIGS. 6A-6B illustrate the display of companion content at two time-offsets. One of ordinary skill in the art will understand that the displayed content in these figures is merely an example of content that could be displayed, and other content is displayed in some embodiments. In the example illustrated in these two figures, the same initial companion content is displayed on two different companion content devices when the time-offset of the media player reaches the time associated with that content by the companion content program data and maintained until the time-offset says it is time to display the next item of companion content. FIG. 6A includes time-offset 610, companion content program data 620, and companion content devices 642A and 642B. The companion content devices 642A and 642B are displaying companion content 660. The time-offset 610 represents the current time-offset of the media presentation at the moment illustrated in the figure. The companion content program data 620 symbolically represents the companion content program data stored in each companion content device 642A and 642B. The companion content program data includes URL 650. The URL 650 represents the URL at which the companion content 660 is found. Companion content 660 is content downloaded by the companion content devices 642A and 642B from the drama12-ad1 file on adcontent.net server 180, as specified by URL 650. The companion content 660 is displayed on the companion content devices 642A and 642B. Companion content 660 is an advertisement that offers to sell a shirt similar to a shirt shown in the media presentation to the users of companion content devices 642A and 642B.

The time-offset 610 is provided to illustrate the time of the media presentation as tracked by both the media player 110 and the companion content devices 642A and 642B. In FIG. 6A, the time-offset 610 has reached 00:00:10 (ten seconds). As shown by the companion content program data 620, "00:00:10" is the time-offset associated with the URL 650 in the companion content program data 620. Accordingly, the companion content devices 642A and 642B are displaying the companion content 660 downloaded from server 180, file drama12-ad1, as specified by URL 650. In this figure, and the other figures that include explicit companion content program data, the URL(s) associated with the currently displayed companion content is indicated (in the companion content program data 620) by a thick black border, while any URLs whose associated content is not shown at that time-offset are indicated with a thin black border. In some embodiments, an item of companion content is displayed from the start time indicated next to the URL until the start time of the next item of companion content listed in the companion content program data. In the figures with explicitly shown companion content program data, there are a limited number of companion content items in the companion content program data. The limited numbers of items are for considerations of space in the figures. It will be clear to one of ordinary skill in the art that some embodiments can provide a much larger number of items of companion content in a particular set of companion content program data.

Though this figure shows content download 230 as happening at the same time as the content 660 is being displayed, in some embodiments, the content download 230 actually occurs before the time-offset specified in the companion content program data 620 is reached. In such embodiments, the companion content device downloads and caches the content before it is due to be displayed. Similarly, in many other figures described herein, companion content is shown being downloaded at the time of use. However, one of ordinary skill in the art will understand that for any such figures, unless otherwise specified, some embodiments cache the content before displaying it. In some embodiments, the content shown as downloaded at the same time it is displayed is actually downloaded once the companion content program data identifies the URL of the companion content.

In the illustrated embodiments, the URL 650 is not displayed on the companion content devices 642A and 642B. However, in some embodiments, the URL 650 is displayed on the companion content device 642A and 642B along with the companion content 660. In still other embodiments, the URL 650 is displayed with some items of companion content and not displayed with other items of companion content. In this figure, none of the devices displays the time-offset. However, in some embodiments, a display of the time-offset will be provided on one or more of the companion content devices, the media player (e.g., as a front panel display), and/or the display device. In some such embodiments, for example, a viewer can use the time-offset associated with an item of companion content to rewind the media back to the time that the companion content was displayed and watch the scene that he might have missed because he was focusing on the companion content that was being displayed at that time. In some embodiments, the companion content device has a jump back mode that would jump playback to a few seconds before an item of companion content was displayed and start playing again. Some embodiments implement such a jump back mode through interactions with companion content and transport controls such as those which are described in sections V and VII below, respectively. In some embodiments, the time-offset will display some of the time, but not all of the time on one or more of the companion content devices, the media player (e.g., as a front panel display), and/or the display device.

FIG. 6B shows the companion content devices at a later time-offset. FIG. 6B includes time-offset 670. This figure demonstrates that in some embodiments, an item of companion content 660 is displayed until the time-offset associated with the next item of companion content is reached. Time-offset 670 indicates that the media presentation has reached a time-offset of 00:03:13 (three minutes, thirteen seconds). That time-offset is one second before the time-offset associated with the second URL in companion content program data 620. The media presentation has continued to play, as shown by the image displayed in the display 120. The image in display 120 has changed from the man shown at time-offset 610 (in FIG. 6A) to the woman shown at time-offset 670. However, the companion content devices 642A and 642B still display the previous companion content 660 because the time to replace that content has not yet arrived. Specifically, as indicated in the companion content program data 620, the next item of companion content is due to be displayed at 00:03:14, one second after the time-offset 670 of FIG. 6B. In FIG. 6B, the server 180 is not shown because in some embodiments the connection with the server providing companion content is severed once the companion content has been downloaded. However, in some embodiments, some items of companion content may require a constant connection to the server while the companion content is being displayed. In FIGS. 6A-6B the companion content is shown as a static image, however, in some embodiments, at least some items of companion content change over time. For example, in some embodiments, the companion content linked to by the URL plays a video clip.

Figure 7A:
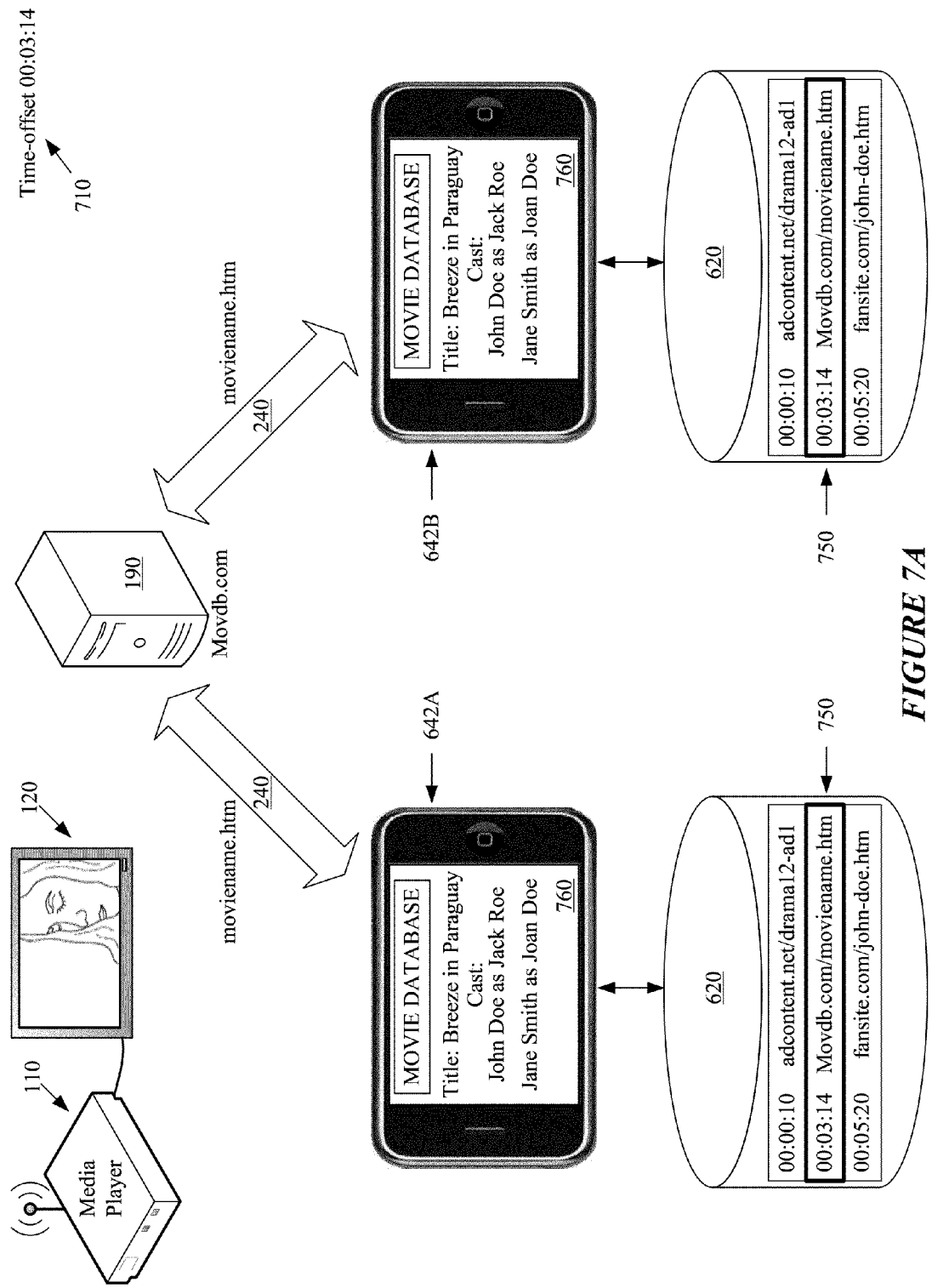
FIG. 7A illustrates the display of another item of companion content at a later time.

FIG. 7A illustrates the same companion content devices 642A and 642B as FIGS. 6A-6B, but at a later time-offset. At the time-offset illustrated in FIG. 7A, the image on the display 120 has not changed since FIG. 6B, but the companion content displayed on the companion content devices 642A and 642B has changed. The figure includes time-offset 710, URL 750 and companion content 760. The time-offset 710 has reached 00:03:14 (three minutes, fourteen seconds). That time-offset is the time-offset associated with URL 750. Accordingly, the companion content devices 642A and 642B are displaying the companion content 760 downloaded from Movdb.com server 190, file moviename.htm, as indicated by URL 750. Specifically, the companion content 760 includes a web site of a movie database. In some embodiments, the companion content can be from URLs that are not affiliated with the producer of the media content, or the media player 110. In this example, the movie database could be a website affiliated with the media presentation producer, the media player producer, or a third party. As illustrated in this figure, each element of the content 760 is being displayed immediately following the download of the content download 240. In some embodiments, however, the content download 240 actually occurs before the associated time-offset specified in the companion content program data 620 is reached. In some such embodiments, the companion content device downloads and caches the content before it is due to be displayed. Some embodiments cache companion content as far ahead as possible.

Figure 7B:
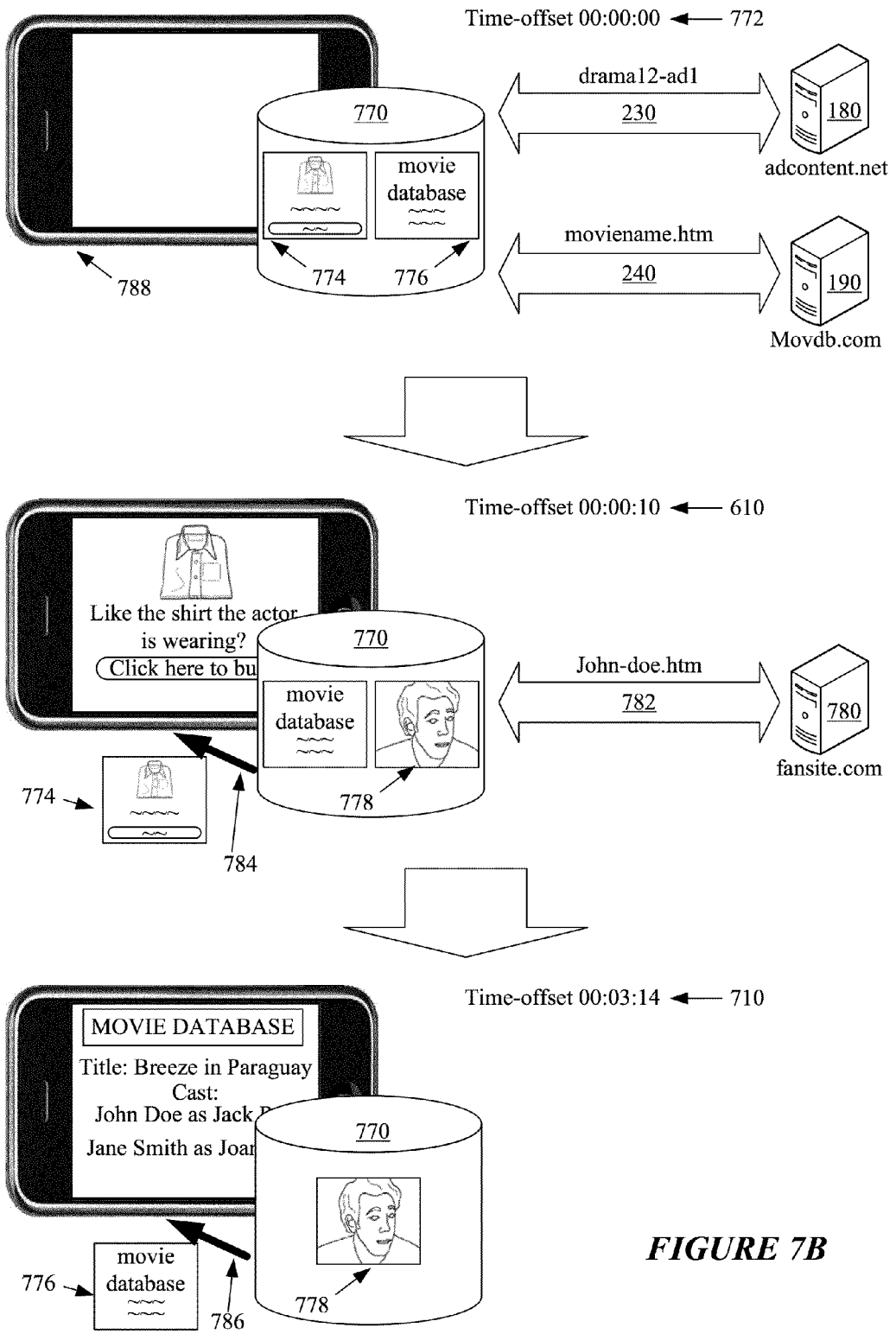
FIG. 7B conceptually illustrates caching and later displaying companion content of some embodiments.

FIG. 7B conceptually illustrates caching and later displaying companion content of some embodiments. The companion content is retrieved from servers before it is needed, then displayed once it is needed. FIG. 7B includes cache memory 770, time-offset 772, cached data 774, 776, and 778, server 780, data download 782, data transfers 784 and 786, and companion content device 788. Cache memory 770 conceptually represents memory (e.g., memory hardware) in the companion content device 788 that is used to cache data. The time-offset 772 (00:00:00) represents a time before any companion content is scheduled to be displayed. Cached data 774-778 conceptually represents items of companion content that are downloaded from servers before the respective items are scheduled for display on the companion content device 788. Server 780 provides companion content 778 from the fansite.com website as listed in companion content program 620 (as seen in FIGS. 6A, 6B, and 7A). Data download 782 conceptually represents the transfer of the companion content 778 to cache memory 770. Data transfers 784 and 786 conceptually represent the transfer of companion content 774 and 776, respectively, from cache memory 770 to other parts (e.g., the processor(s), other memory, the display, etc.) of companion content device 788.

In some embodiments, such as the embodiment illustrated in FIG. 7B, the companion content device 788, downloads items of companion content in advance (i.e., before the time offset specified in companion content program 620 for the display of the respective companion content items). In this figure, the downloads 230 and 240, which retrieve companion content from adcontent.net and Movdb.com occur as soon as the media presentation begins playing the media presentation at time-offset 772 (00:00:00). Once the media presentation reaches time-offset 610 (00:00:10), the companion content device 788 draws the cached data 744, scheduled for that time, from the cache memory 770 (e.g., through data transfer 784). The data transfers 784 and 786 are internal transfers of data from cache memory 770 to other parts of the companion content device. Such internal transfers are different from downloads 230 and 240, which download data from an external source (e.g., over the Internet or a cellular network). Internal transfers have several advantages, including reducing or eliminating delay times for displaying the content and compensating for possible intermittent or slow external connections (e.g., from being in a bad reception area).

The illustrated companion content device 788 is an embodiment that stores two items of companion content in its cache memory 770. Accordingly, during or after the transfer 784, the companion content device 788 downloads (to cache memory 770) the next item of companion content in the companion content program (as shown in FIG. 7A). In this case, the next item of companion content 778 is "John-doe.htm", from the fansite.com website. Therefore, the companion content device downloads companion content 778 from the fansite.com server 780 in download 782. Although the download 782 is shown as going directly to the cache memory 770, one of ordinary skill in the art will understand that it is the companion content device 788 that is downloading the data and storing the data in a cache. At later time-offset 710 (00:03:14), the companion content device retrieves (by data transfer 786) the movie database item of companion content 776 from the cache memory 770. The companion content device 788 then displays companion content item 776.

The embodiments illustrated in FIG. 7B begin caching at time offset 772 (00:00:00). However, one of ordinary skill in the art will understand that some embodiments may cache items at a later time. One of ordinary skill in the art will understand that caching takes a finite amount of time and that (depending on the network speed) the caching process may continue for some time. Additionally, in some embodiments, the media player broadcasts the location of the companion content program before the media item begins playing (e.g., the media player broadcasts a URL as soon as a media item is inserted into the media player, before the media player receives a command to play the media item). In such embodiments, the companion content device may begin caching companion content even before time-offset 00:00:00. The embodiments illustrated in FIG. 7B cache the next two items of companion content. However, one of ordinary skill in the art will understand that in some embodiments, different numbers of items may be cached (e.g., 4 items at a time, 8 items at a time, etc.) Furthermore, some embodiments cache as many items of companion content as possible, given the size of the cache memory. Some embodiments provide dedicated cache memory hardware and some embodiments use multi-purpose memory hardware as cache memory 770.

V. Interacting with Companion Content

The above section described the display of companion content in the absence of user interaction. An item of such companion content in some embodiments includes one or more of static images, text, video, and audio, interactive controls, etc. However, items of companion content in some embodiments also include optional images, text, audio, video, interactive controls, etc. that are displayed in response to user interaction with the item of companion content. The display of an item of companion content in some embodiments includes both (i) the initial display of the video, audio, etc. that are displayed whether or not the user interacts with the content and (ii) any optional images, text, audio, video, interactive controls, etc. that are displayed in response to user interaction with the item of companion content.

The optional images, text, etc. of some embodiments are displayed when a user chooses to interact with the content. The user of a companion content device can select actions or click on links provided by the initial display of the companion content. In some embodiments, the interactive content is relevant to the media presentation that is being viewed or has just been viewed. For example, the interaction could involve voting, testing, or feedback about the viewed material. In some embodiments, the user's identity is noted and used to track input/responses to the companion content, surveys, voting, tests, etc. In some embodiments, the interactions are optionally anonymized. When different users select different options in the companion content, each user can have unique interactions with the companion content.

Figure 8A:
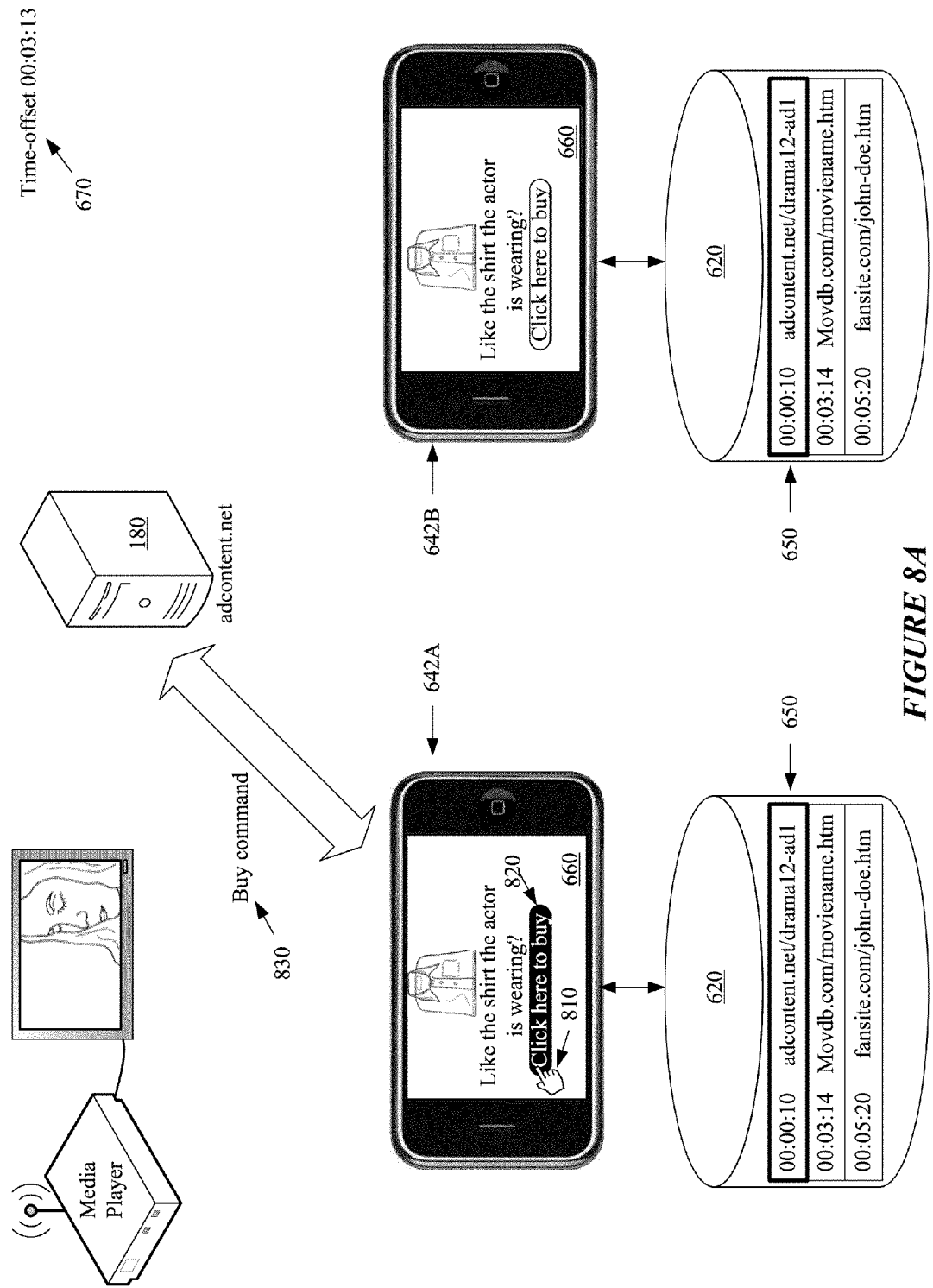
FIGS. 8A-8C illustrate an example of interaction with companion content of some embodiments.
Figure 8B:
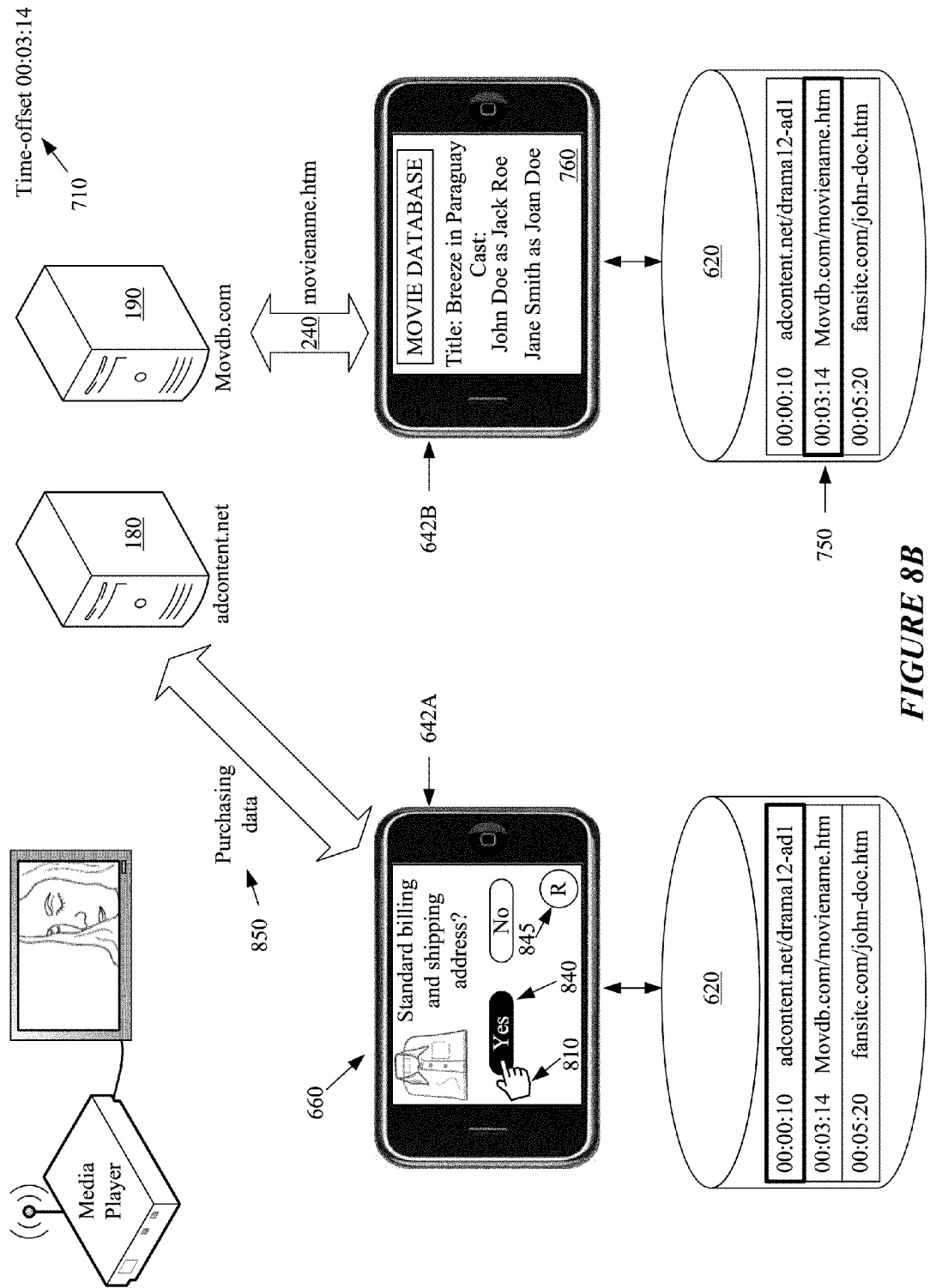
Figure 8C:
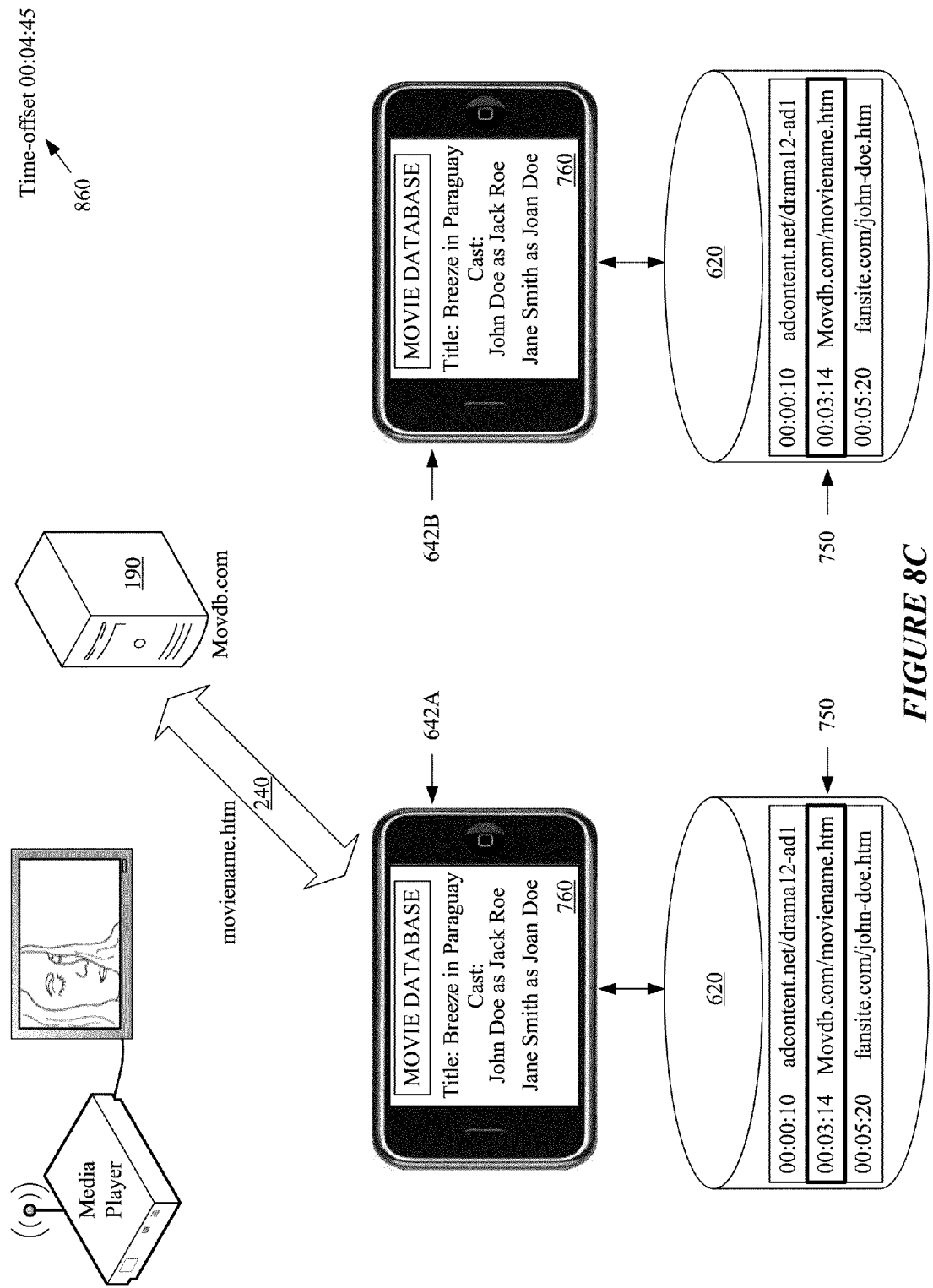

FIGS. 8A-8C illustrate an example of interaction with companion content of some embodiments. These figures include the same companion content devices 642A and 642B and the same companion content program data 620 as shown in FIGS. 6A, 6B, and 7A. However in FIGS. 8A-8C the user of companion content device 642A interacts with the first displayed companion content 660 so the items displayed on the companion content device 642A are sometimes different than the items displayed in FIGS. 6A, 6B, and 7A. FIG. 8A illustrates the first action of a user to buy an advertised item. The figure includes cursor 810, buy icon 820, and buy command 830. Cursor 810 represents the location of a click on the companion content. Buy icon 820 is a selectable user-interface item that when selected allows a user to buy the advertised shirt. Buy command 830 is a command sent to the adcontent.net server 180 from the companion content device 642A.

The time-offset 670 shows that the media presentation is at time-offset 00:03:13, just before the time-offset at which the companion content is due to change to the next URL in the companion content program data 620. Buy icon 820 shows by its inverted colors that a user has clicked on buy icon 820 with cursor 810 to indicate a desire to buy the advertised shirt. In some embodiments, this click is performed by a tap of a user's finger (not shown) on a touch sensitive screen of companion content device 642A rather than a click of a cursor control device. In some such embodiments, no cursor is displayed. In response to the selection of buy icon 820, the companion content device 642A sends a buy command 830 to the server adcontent.net server 180. The command is sent in whatever manner is specified by the companion content 660. In some embodiments, the command may be sent to a server other than the original server of the companion content 660. An example of a command being sent to a server other than the original server of the companion content is provided in FIG. 9, below. On companion content device 642B, companion content 660 remains the same as in FIG. 6B because the user of companion content device 642B has not clicked on the buy icon in companion content 660.

FIG. 8B illustrates a later part of an interaction with companion content. In this figure, the companion content devices 642A and 642B are behaving differently from one another due to the user's interaction with companion content device 642A as shown in FIG. 8A. FIG. 8B includes shipping confirmation icon 840, return button 845 (that are displayed on companion content device 642A), and purchasing data 850. The shipping confirmation icon 840 is a selectable user-interface item that when selected indicates the user's agreement to use the standard billing and shipping information to make the purchase. The return button 845 is an escape key to return to the scheduled companion content. The purchasing data 850 is sent to the server 180 to provide the server with the user's billing and shipping address.

In this figure, the time-offset 710 is at 00:03:14, the time-offset associated with companion content 760, not companion content 660. Accordingly, companion content device 642B is retrieving companion content 760 from server 190 through content download 240 as specified by URL 750 in companion content program data 620. Companion content device 642B is also displaying companion content 760. However the embodiment of FIG. 8B holds over a previous piece of companion content if a user is interacting with that companion content when the time-offset associated with a new item of companion content arrives. Here, the user of companion content device 642A is engaged in the purchase of a shirt, so companion content device 642A holds over the shirt advertisement content until the purchase is finished. In some embodiments, the advertising web site or the companion content device 642A itself stores shipping and billing information so that a user does not have to enter the information with every purchase. When the user clicks the icon 840, purchasing data 850 is sent to the server 180 in order to continue the purchase of the shirt. In this figure, the user of companion content device 642A only clicks the shipping confirmation icon 840. However, one of ordinary skill in the art will understand that other steps may be involved in ordering and paying for the shirt (e.g., price information, size selection, etc.). In some embodiments, when a user begins to interact with an item of companion content, a return button 845 is displayed. The return button 845 allows the user to abort the interaction and return to the scheduled companion content right away. Some embodiments provide a bar that allows switching between (i) companion content with which the user is interacting and (ii) the scheduled companion content. In some embodiments, the user may see the companion content progressing in a pane above or below the main interaction window, so that the entire time that the user is interacting with the companion content the user can see the additional items (e.g. thumbnails and/or text summaries) displayed in a list.

FIG. 8C illustrates the post ordering phase of an interaction with companion content. FIG. 8C includes time-offset 860. The time-offset 860 indicates that the media presentation has reached 00:04:45. As the time-offset has not yet reached the time-offset associated with the next URL after URL 750 (the URL associated with companion content 760) in the companion content program data 620, the companion content device 642B continues to display companion content 760. The companion content device 642A, having finished the order, is downloading (in download 240 from server 190) and displaying companion content 760. In some embodiments, the companion content device 642A automatically starts displaying the current companion content as soon as an interaction with the previous companion content is complete. In other embodiments, once an interaction with a piece of companion content begins, the companion content device 642A continues to display that companion content until the user dismisses that companion content with some command (e.g., a click or a shake of the device, etc.).

The preceding figures showed the companion content device contacting the servers 180 and 190 as indicated in the URLs provided in the companion content program data. However, one of ordinary skill in the art will understand that in any system where links from one domain to another are possible, the sources of various data in the companion content could be from any server or domain on the Internet or any other network linked to the companion content device 642A. Furthermore, one of ordinary skill in the art will realize that some companion content may direct the companion content device 642A to contact servers other than the servers in the URLs of the companion content program data. Accordingly, in some embodiments, retrieving and displaying an item of companion content can involve contacting one or more domain names that are not listed in the companion content program data. For example, the URL of an item of companion content may identify a web page or file that automatically redirects the companion content device to another URL. Also, a web page or file associated with a URL in the companion content program data may include linked or embedded items from other domains.

Figure 9:
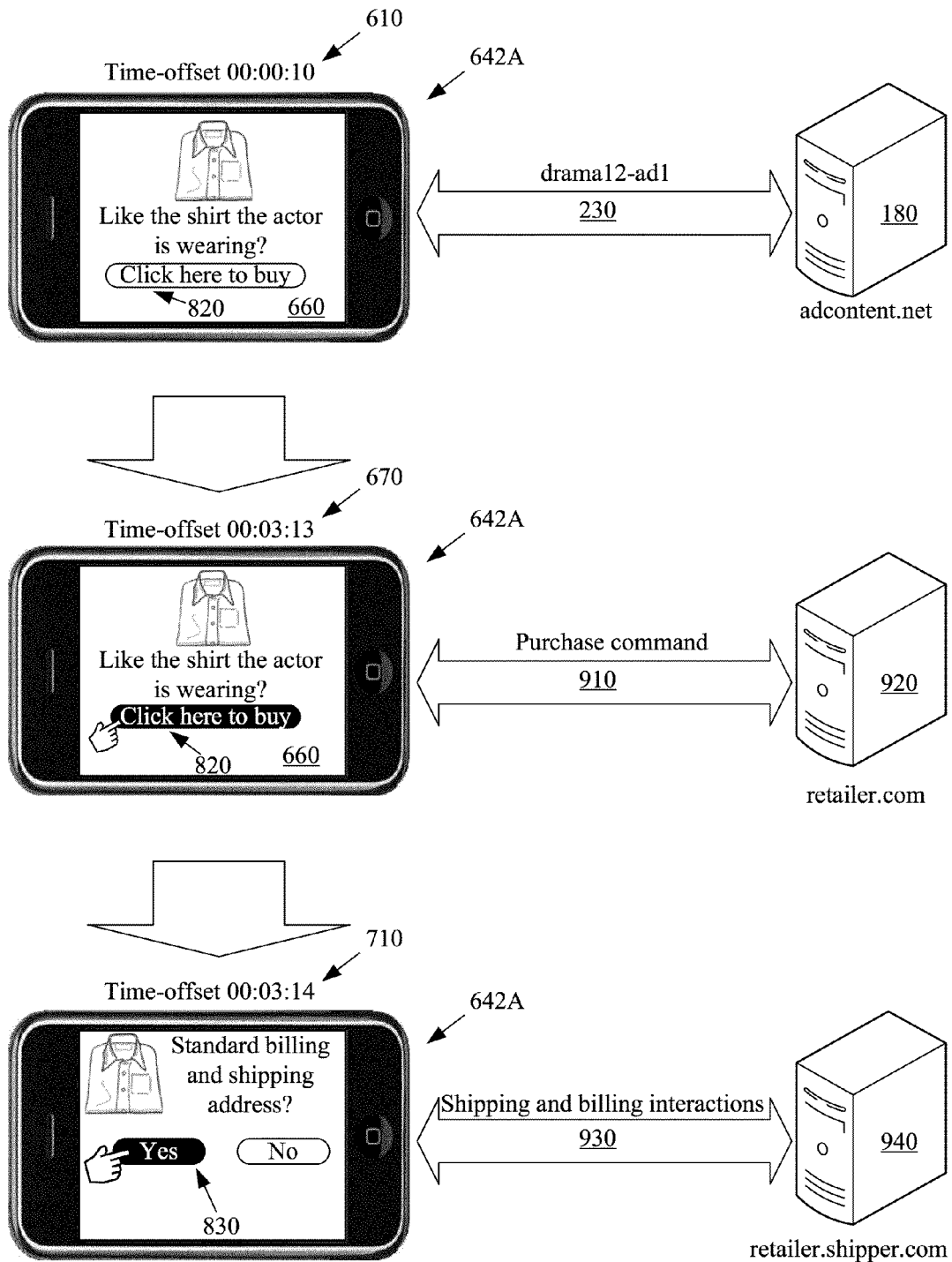
FIG. 9 illustrates an example of a companion content device contacting multiple servers while interacting with an item of content.

FIG. 9 illustrates (in sequential stages) companion content directing a companion content device to contact another domain. The figure illustrates the same sequence of events in which a user uses a companion content device 642A to purchase a shirt as was shown in FIGS. 6A, 8A, and 8B. However, in FIG. 9, the companion content device 642A contacts multiple servers in turn. FIG. 9 includes data upload 910 to server 920 and data download 930 from server 940. Data upload 910 is a transmission of a purchasing command from the companion content device 642A to the server 920. Data download 930 is a transmission of a query about billing and shipping address from the server 940 to companion content device 642A.

In this embodiment, the companion content 660 is received from server 180 in download 230 at time-offset 610 (00:00:10). The companion content 660 includes a buy icon 820. The buy icon 820 allows a user to begin the process of purchasing a shirt. In this example, the buy icon 820 does not link back to the server 180 that originally provided the companion content 660. Instead the buy icon 820 links to the Retailer.com server 920. Accordingly, when the user clicks on the buy icon 820 at time-offset 670 (00:03:13), the companion content device 642A sends a purchase command in data upload 910 to the Retailer.com server 920. In the illustrated example, the Retailer.com server 920 does not handle purchase orders single-handedly. Instead, the Retailer.com server 920 utilizes another server's assistance for shipment processing purposes and redirects the user's purchase request to the Retailer.shipper.com server 940 for a reply to the request in the companion content device 642A. The companion content device 642A receives the reply at time-offset 710 (00:03:14) through data download 930. The companion content device 642A displays, also at time-offset 710 (00:03:14), the question "standard billing and shipping address?" to the user. In the process of completing one order, the companion content device 642A receives an advertisement from one server 180, sends an acceptance of the offer to another server 920, and receives a query for transaction data from the third server 940. Owing to limitations of space, FIG. 9 does not show the media player 110 or display 120. The remaining figures, described below show many images of companion content devices, but do not show the media player 110, display 120, or any pictures of servers. However, one of ordinary skill in the art will understand that the companion content shown in the illustrated embodiments is retrieved from servers and is synchronized with media presentations played by a media player and displayed on a display. While FIG. 9 illustrates a sale in which the retailer's server redirects the request to a third party server, one of ordinary skill in the art will understand that in some embodiments, the retailer's server handles the entire user interaction single-handedly without redirecting the user's request to a third party server.

Figure 10:
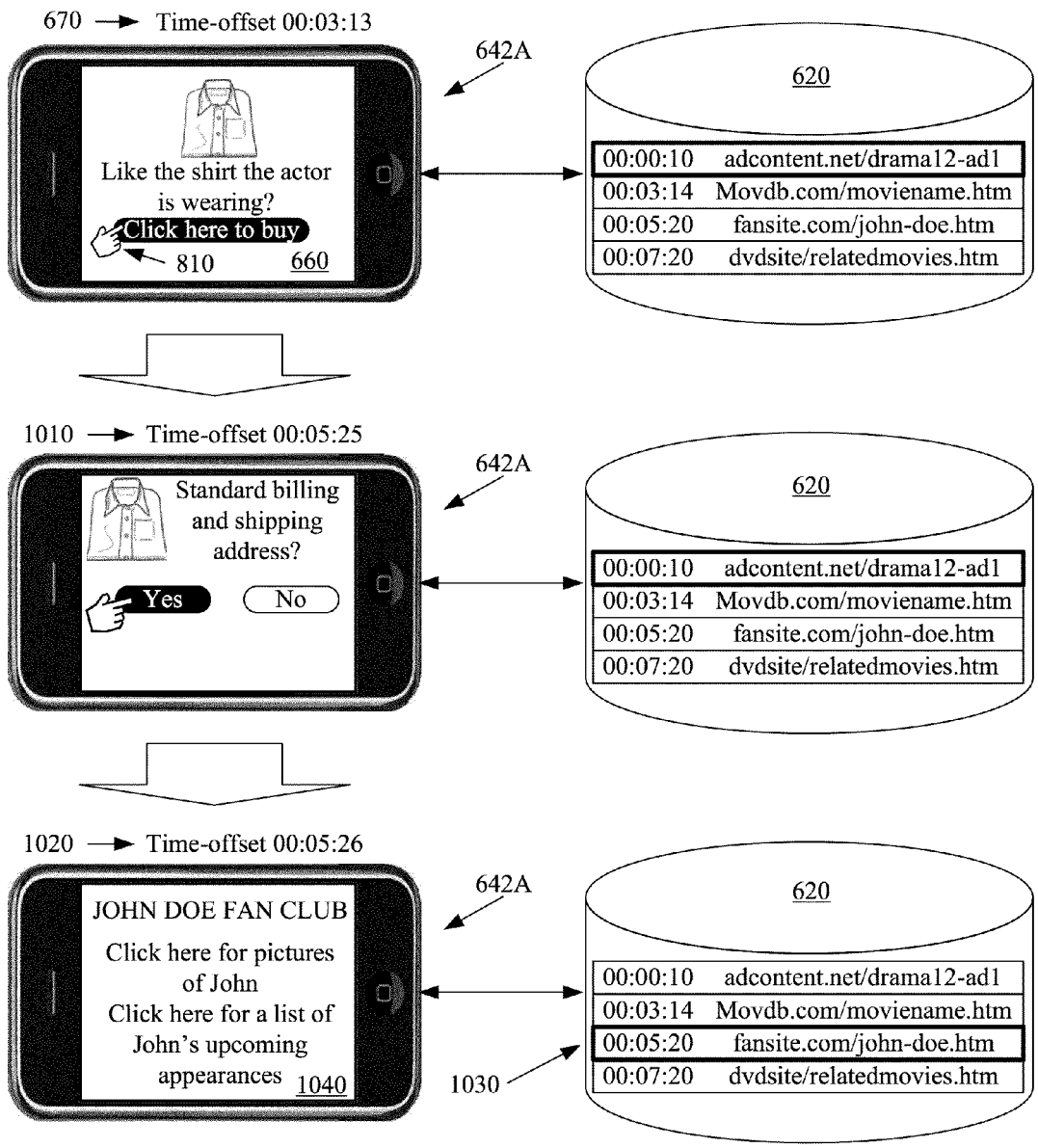
FIG. 10 illustrates a method of some embodiments of resuming an interrupted schedule of companion content after a long disruption of the schedule by a user's interaction with item of companion content.

FIGS. 8A-8C show how, in some embodiments, the companion content device returns to the schedule established in companion content program data 620 if a user is (1) still interacting with one item of companion content when the companion content program data specifies that a second item of companion content is scheduled to start, but (2) finishes the interaction before a third item is scheduled to start. However, when the user interaction with a first item of companion content takes long enough to cover the entire display period of the second item of companion content, some embodiments skip the second item of companion content entirely. When the interaction is over, such embodiments display whatever companion content is currently scheduled. FIG. 10 illustrates an example of such an approach.

FIG. 10 illustrates an embodiment that does not display an item of companion content if that item's entire scheduled time is used up while the user interacts with a prior item of companion content. This figure shows a sequence of companion content displays by a single companion content device at different time-offsets. In each step of the sequence, the time-offset during that step is shown above the companion content device. FIG. 10 includes time-offsets 1010, 1020, and 1030, and companion content 1040. Companion content 1040 is the third item of companion content specified in companion content program data 620. Time-offset 1030 is the time-offset at which companion content 1040 is due to be displayed. Time-offset 1010 is a time-offset just before a user interaction with companion content 660 is completed. Time-offset 1020 is a time-offset after the user interaction is completed.

In the figure, the user begins interacting with the first companion content 660 of companion content program data 620 at time-offset 670 (00:03:13). Time-offset 670 (00:03:13) is just before the second companion content is due to be displayed (at 00:03:14) according to companion content program data 620. The user interaction continues until time-offset 1010 (00:05:25). Time-offset 1010 (00:05:25) is after the time-offset 1030 (00:05:20) at which the third companion content 1040 is due to start, according to companion content program data 620. Therefore, the user interaction spans the entire scheduled display time of the second item of companion content in companion content program data 620. In the embodiment illustrated in this figure, the companion content program data 620 simply skips the companion content whose scheduled time has been used up by the user interaction. Accordingly, after the user interaction is completed at time-offset 1010 (00:05:25) the companion content device 642A displays the companion content 1040 at time-offset 1020 (00:05:26).

Figure 11:
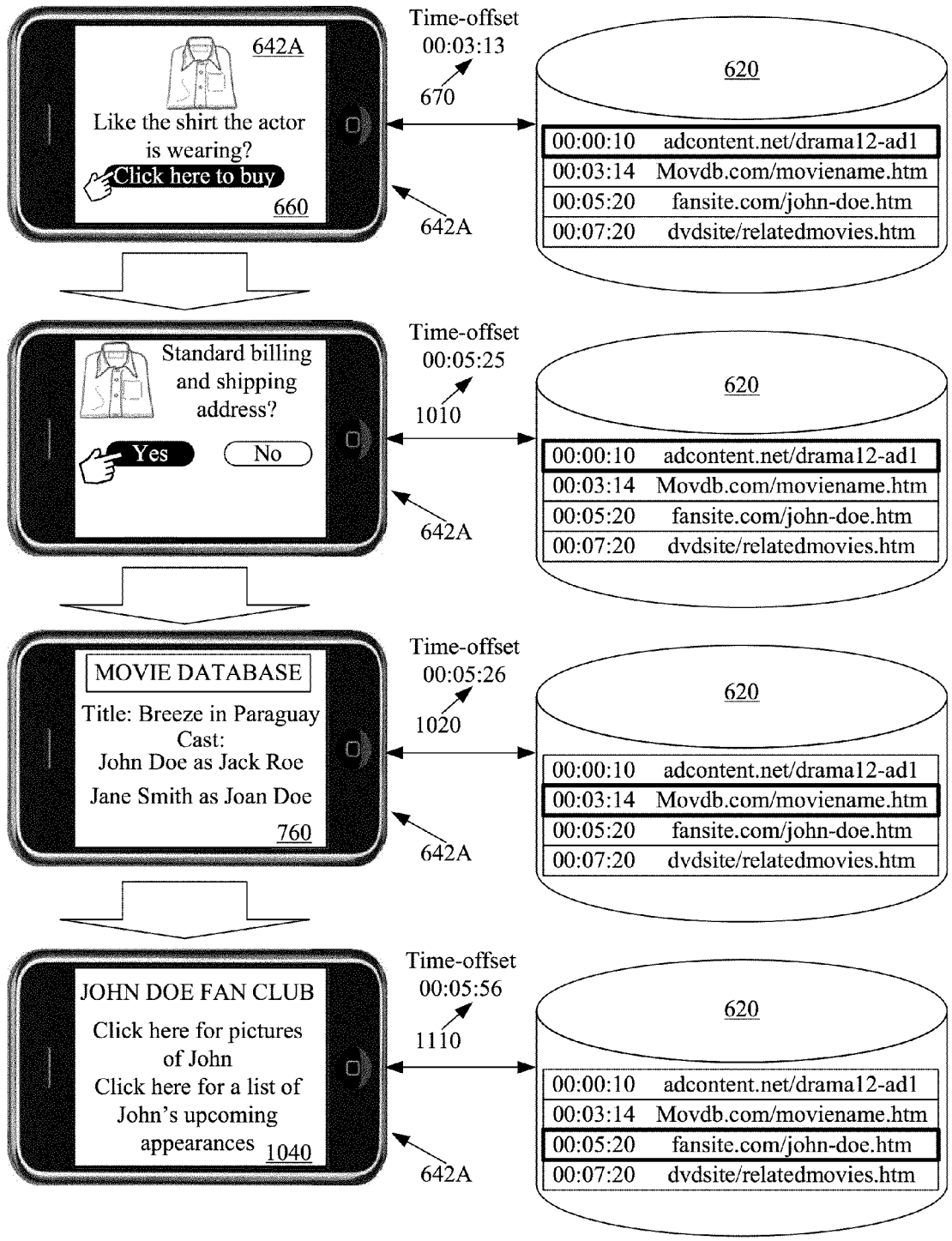
FIG. 11 illustrates another method of some embodiments of resuming an interrupted schedule of companion content after a long disruption of the schedule by a user's interaction with item of companion content.

While the embodiment illustrated in FIG. 10 skips items of companion content entirely when the scheduled time for that content is used up by user interactions with a preceding item of companion content, other embodiments briefly display items of companion content whose scheduled time is used up. FIG. 11 illustrates such an embodiment.

FIG. 11 illustrates an embodiment that briefly displays an item of companion content even if that item's entire scheduled time is used up while the user interacts with a prior item of companion content. FIG. 11 shows an embodiment that tries to catch up with missed content. FIG. 11 includes time-offset 1110. Time-offset 1110 is a time-offset approximately thirty seconds after the user interaction is complete. The user interactions and companion content program data 620 are the same in this figure as in FIG. 10. However, in this embodiment, the companion content device 642A is programmed to display companion content items in order, even if one or more of them has missed their scheduled display time due to user interaction with a previously scheduled item of companion content. Therefore, at time-offset 1020 (00:05:26) the companion content device 642A displays the second item of companion content in companion content program data 620, companion content 760. The companion content device 642A displays the companion content 760 for thirty seconds, then displays the companion content 1040 at time-offset 1110 (00:05:56). One of ordinary skill in the art will realize that other embodiments could display the "missed" content for other amounts of time than thirty seconds. In some embodiments, where multiple items of companion content have been missed, the companion content device will display each missed item for some brief period of time. In some embodiments, the period of time for which missed items are displayed varies depending on the circumstances. In some embodiments, companion content program data can include data that determines whether a particular item will be skipped or briefly displayed if its scheduled display time is missed.

When an item of companion content takes too long to download, its allotted time can expire before the content is fully downloaded. In some cases, the content is fully downloaded within the allotted time, but with insufficient time remaining to fully display. For example, a one minute video clip could finish downloading with only 30 seconds remaining of its allotted time. This can happen when either the download is too slow even with caching or because of a sudden jump of the media presentation (fast forwarding or rewinding) to a time-offset that is not cached. In some embodiments, the companion content device moves on to the next item of companion content, cutting off the end of the late content or skipping it entirely, similar to the manner of dealing with extended user interaction shown in FIG. 10. In other embodiments, the companion content device displays the content briefly before moving on to the next item of companion content. In still other embodiments, any content that is not fully cached by the scheduled start time of that content is skipped in favor of continuing to play the previous item of companion content.

In some embodiments, rather than skipping any content, the companion content device opens updated content in a separate window or in the background and allows the user to switch between content that the user is interacting with and the currently active content. In some embodiments, a companion content device can display multiple content items in a browser window.

Figure 12A:
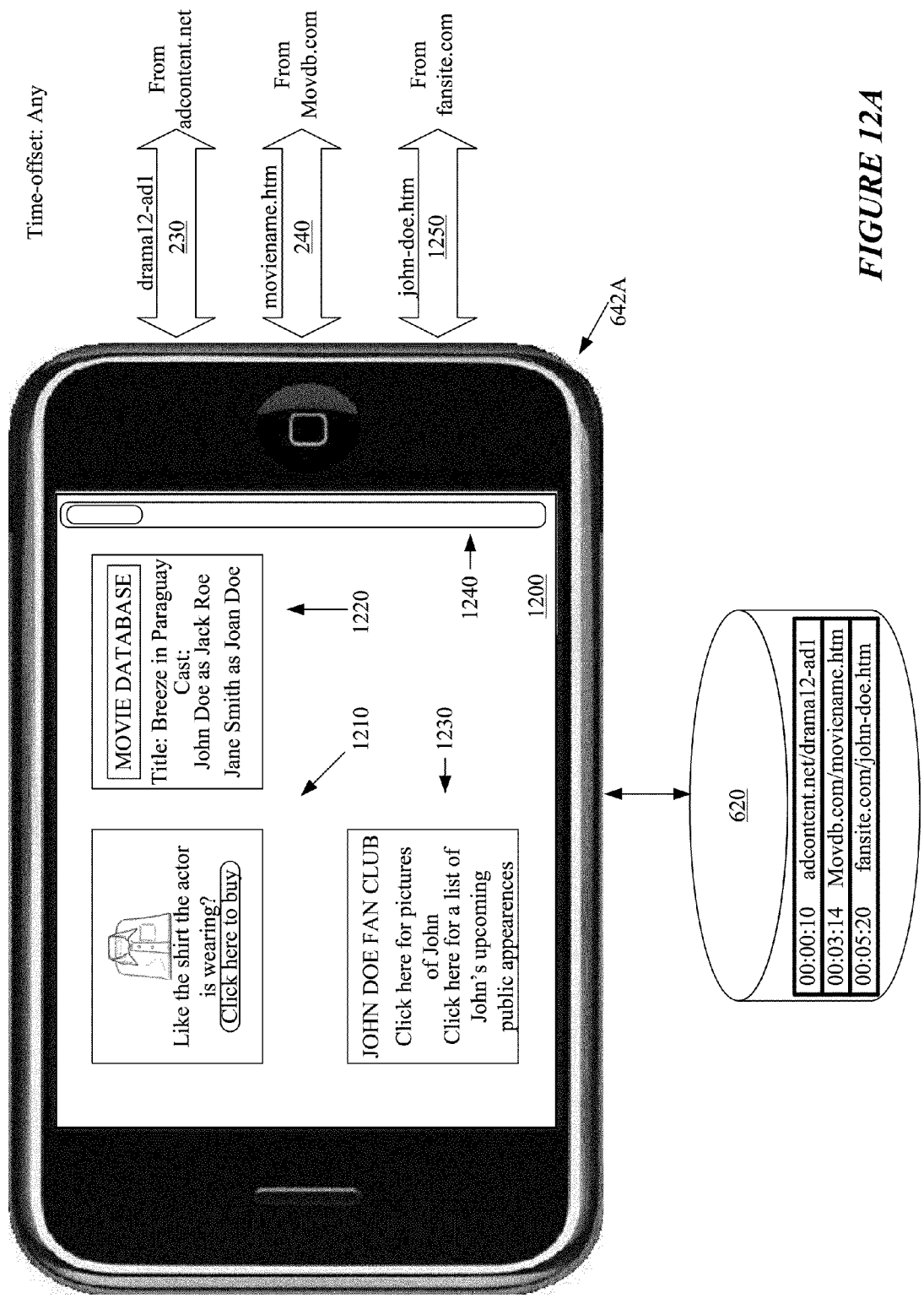
FIG. 12A illustrates a companion content browsing mode of some embodiments.

Some embodiments include a browsing mode that allows a user to select from among all available items of companion content of a media presentation. FIG. 12A illustrates an embodiment with a browsing mode. The figure includes browsing mode 1200 with browsing windows 1210-1230, scroll bar 1240, and companion content download 1250. In some embodiments, each browsing window 1210-1230 displays a thumbnail image of an item of companion content. In some other embodiments the thumbnail image of the item of companion content can be accompanied by other information such as the URL and time-offset associated with the item of companion content. The scroll bar 1240 allows a user to shift the display to show browsing windows of later-scheduled or earlier-scheduled companion content. The companion content download 1250 is a download of companion content from the third URL of companion content program data 620.

In some embodiments, the user can access any item of companion content by entering browsing mode 1200 and selecting the browsing window 1210, 1220, or 1230 that displays that item of content. The browsing windows 1210-1230 of some embodiments include thumbnails, which are small images of the companion content. The companion content that is displayed (in miniature) in the browser windows is the same companion content that is downloaded from the companion content servers with companion content downloads 230, 240, and 1250. In some embodiments the thumbnail images are static images, even if the companion content they represent includes motion images. In other embodiments, some or all of the video or other time variant content an item of companion content is played in the browsing window corresponding to that item of companion content.

There are only three browsing windows displayed in FIG. 12A. However, one of ordinary skill in the art will realize that in some embodiments larger numbers of browsing windows can be displayed and more than three items of companion content for a given media presentation can be provided by the companion content program data for that presentation. Although the figure shows the companion content device 642A retrieving content from the servers (companion content downloads 230, 240, and 1250), in some embodiments, the companion content device 642A downloads the companion content in advance and caches the downloaded companion content.

Figure 12B:
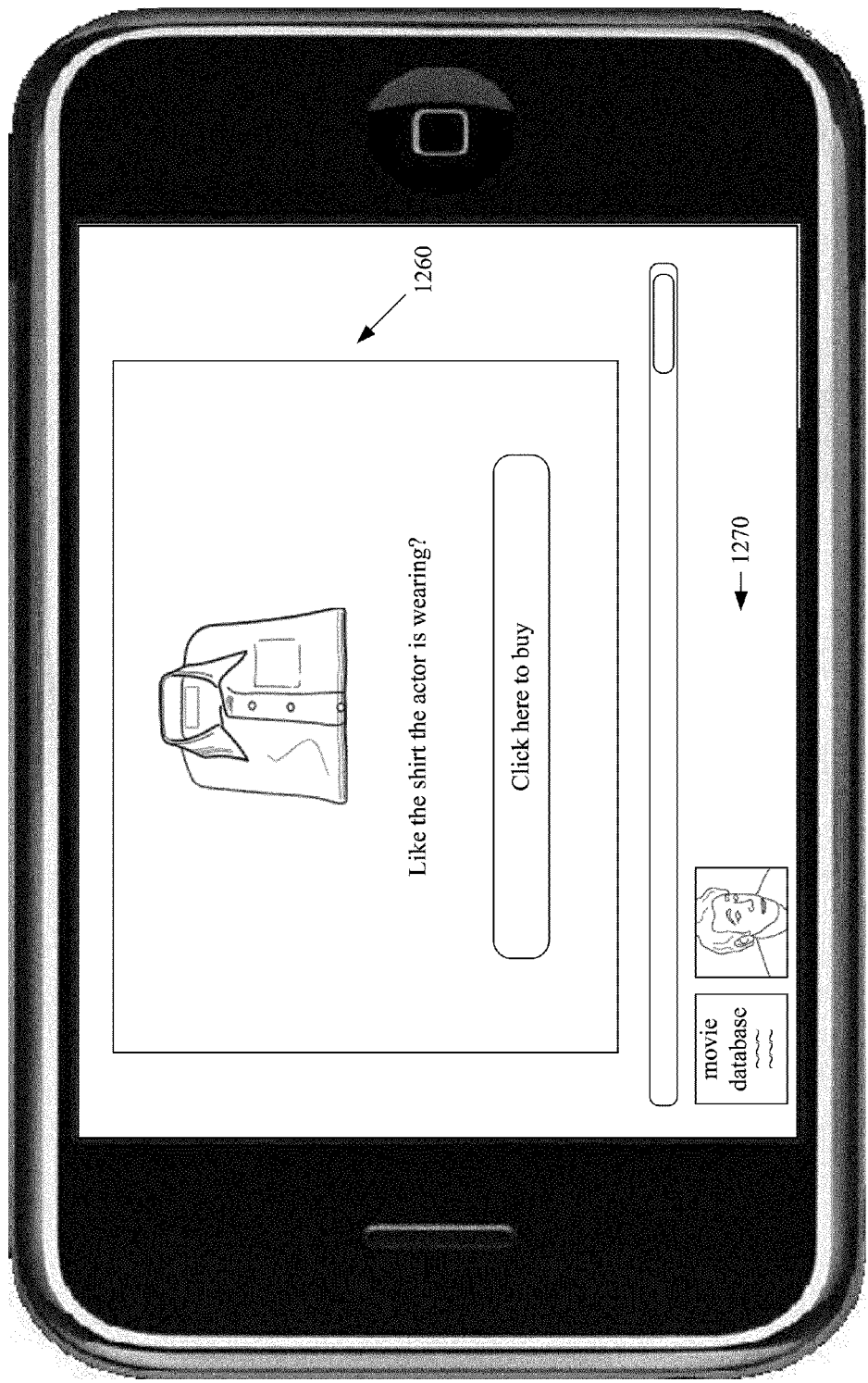
FIG. 12B illustrates another embodiment of a companion content browsing mode.

FIG. 12B illustrates another embodiment of a companion content browsing mode. In this figure, an interactive content window 1260 is displayed (and available for the user to interact with) on the same screen as companion content selector icons 1270. In some embodiments, the companion content selector icons are available only upon a particular control being activated (e.g., double clicking on a button of the companion content device). In other embodiments, the companion content selector icons 1270 are available at all times. In still other embodiments, the companion selector icons are available unless deactivated by the use of a control of the companion content device.

VI. Multi-Channel Companion Content Program Data

Figure 13A:
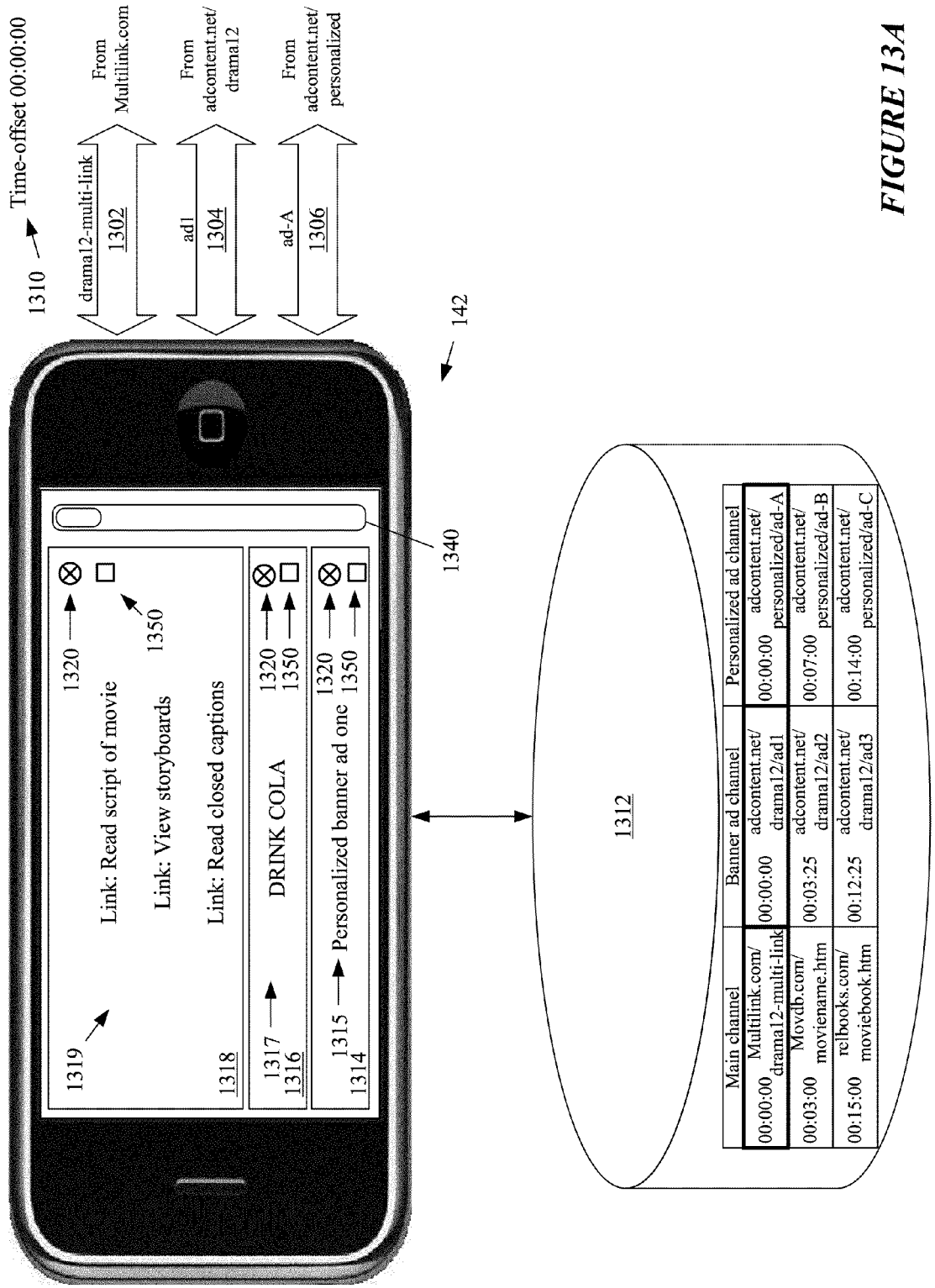
FIGS. 13A-13C illustrate multi-channel companion content program data and the display of items from different channels at different time-offsets.
Figure 13B:
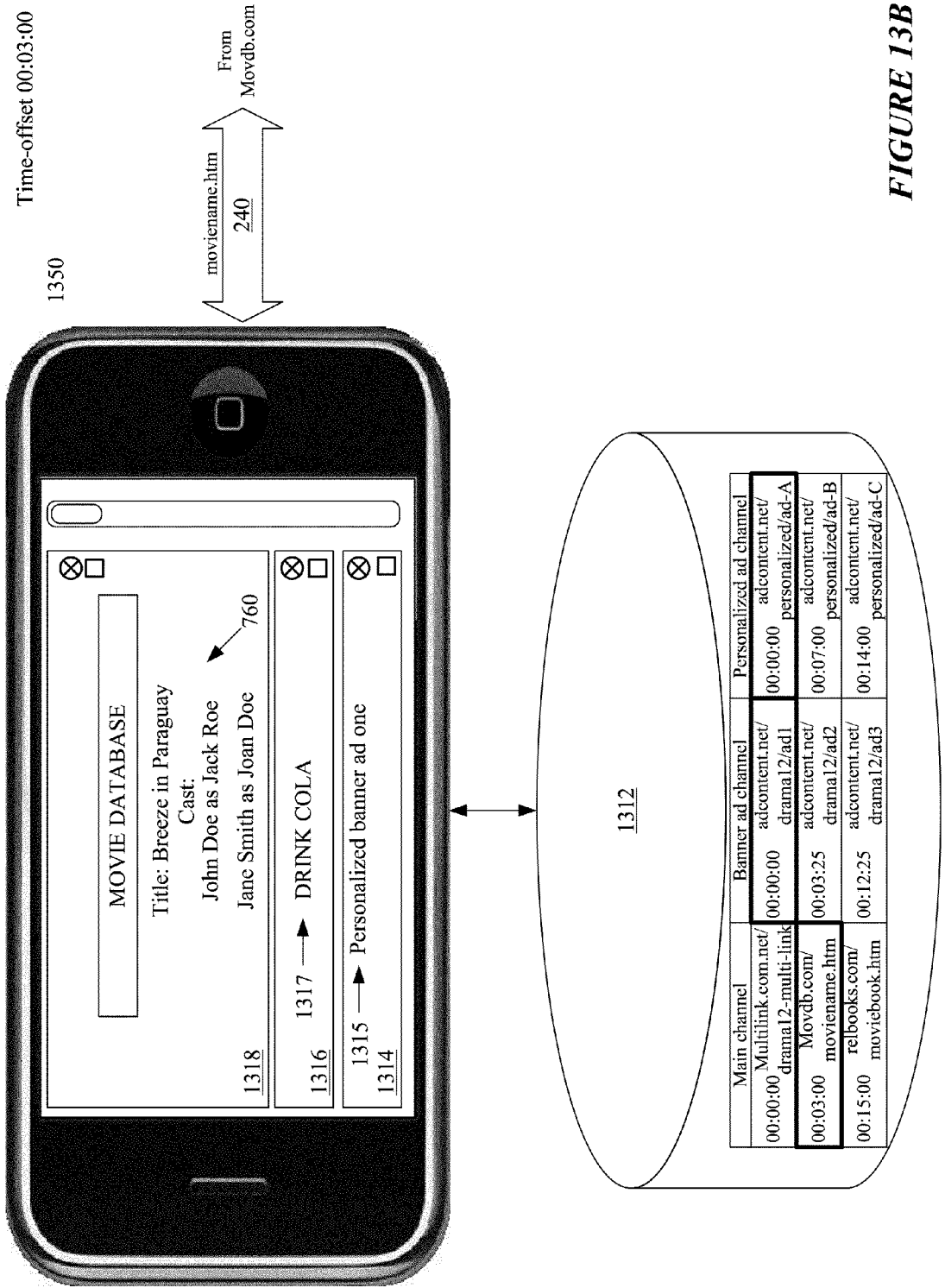
Figure 13C:
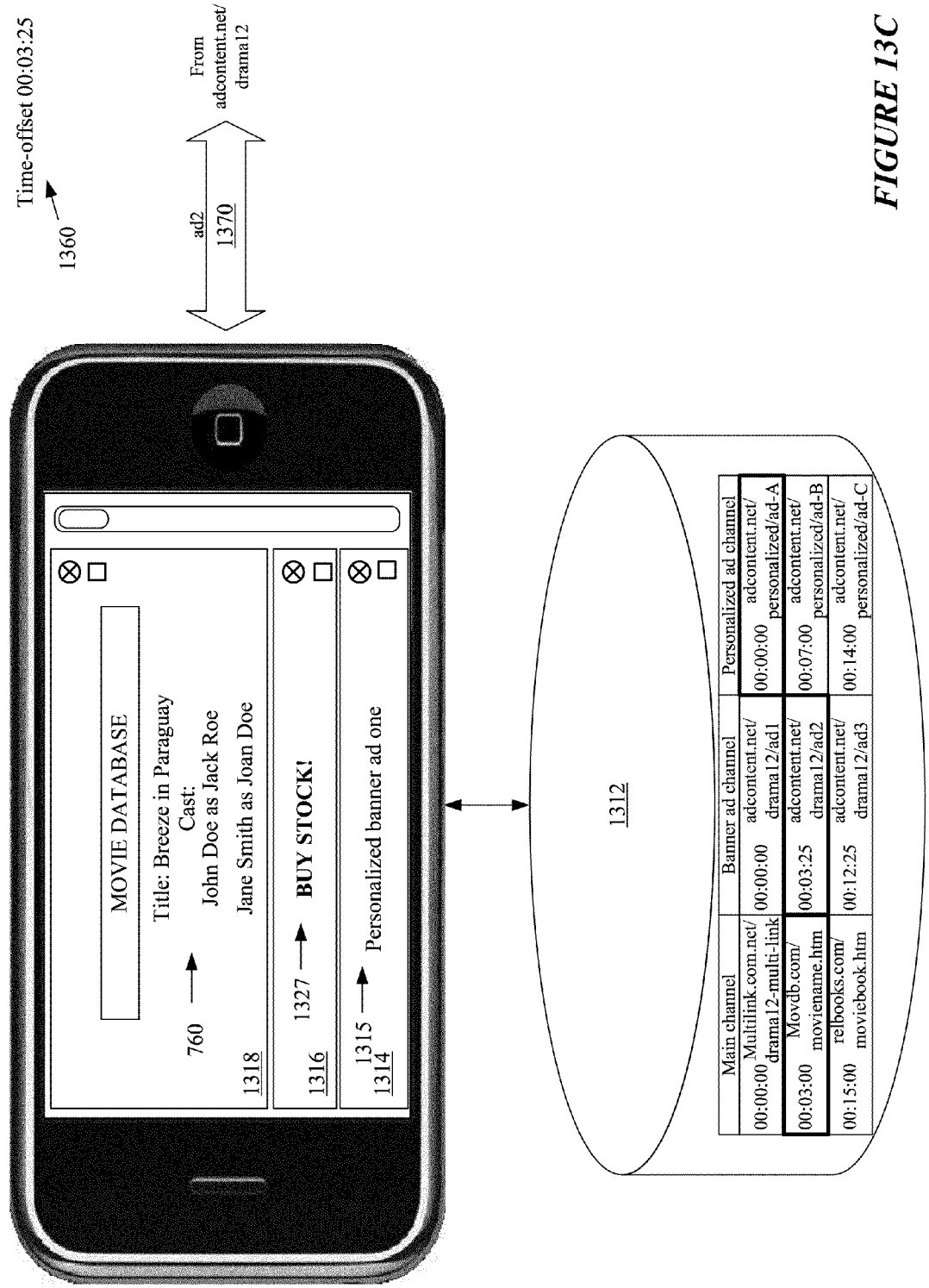

The figures in the previous sections illustrated companion content devices that were displaying one channel of companion content. However, some embodiments provide and display multiple channels of companion content. For example, one channel could have advertisements, one channel could have related/additional content, etc. FIGS. 13A-13C illustrate multi-channel companion content program data and the display of multiple channels at different time-offsets.

FIG. 13A includes content downloads 1302, 1304, and 1306, time-offset 1310, multi-channel companion content program data 1312, three channel display windows 1314, 1316, and 1318, companion content 1315, companion content 1317, companion content 1319, scroll bar 1340, maximize-channel buttons 1350, and close-channel buttons 1320. The time-offset 1310 represents the time-offset of a media presentation (not shown). Multi-channel companion content program data 1312 shows the URLs of the companion content related to the media presentation (not shown) and the times associated with each URL. The scroll bar 1340 allows a user to shift the display to show channel display windows of later-scheduled or earlier-scheduled companion contents. One of ordinary skill in the art will realize that the format of the companion content program data as a table is symbolic and that the data can be presented to the companion content device 142 in other formats than as a table (e.g., the companion content program data could be presented as html code).

The channel display window 1314 displays companion content from the banner ad channel of companion content program data 1312. The channel display window 1316 displays companion content from the personalized ad channel of companion content program data 1312. The main channel display window 1318 displays companion content from the main channel of companion content program data 1312. The channel display windows 1314, 1316, and 1318 display the companion content 1315, 1317, and 1319, respectively. Companion content 1315 is a banner advertisement. Companion content 1317 is a personalized advertisement. Companion content 1319 is a set of links to further information about the media presentation. The companion contents 1315, 1317, and 1319 have been downloaded through the downloads 1302-1306, from the URLs indicated for time-offset 1310 in their respective channels in the companion content program data 1312. Maximize-channel buttons 1350 of some embodiments enable the user to maximize the display window of their respective channels in order to display additional information related to the corresponding companion contents (e.g., a "buy now" icon, etc.). Close-channel buttons 1320 enable the user to close the display windows of their respective channels.

This figure shows three channels of companion content displayed in three display windows 1314, 1316, and 1318. The display windows 1314, 1316, and 1318 are displaying the contents associated with time-offset 00:00:00 in their respective channels in the companion content program data 1312. Specifically, display window 1314 is displaying personalized banner ad one, downloaded from URL adcontent.net/drama12/ad1. Although a specific URL is listed, some embodiments can track user patterns and customize content to the user. In some embodiments, the tracking feature uses web analytics to track the interactions of the user with the companion content device 142. For example, the analytics could track the types of movies the user watches while using the companion content device 142 or the types of products the user has bought in the past from various advertisements on the companion content device 142. In some embodiments, the tracking is performed on the servers being contacted, which provide the personalized ads based on information previously collected by that server or other servers. In some embodiments, the companion content program data 142 performs the tracking and the URL links to a page that accesses the tracking data on the companion content device 142 and provides an appropriate personalized advertisement based on the tracking data from the companion content device 142. In some embodiments, the tracking feature includes an option for the user to temporarily or permanently block tracking.

Display window 1316 displays companion content 1317, an advertisement related to a specific aspect of the media presentation between time-offsets 00:00:00 and 00:03:25 (the start and end of the display of that advertisement according to the companion content program data 1312), downloaded from URL adcontent.net/personalized/ad-A. For example, the banner advertisement could be an advertisement of a product shown on the media presentation sometime between those two time-offsets such as a set of curtains, a pair of glasses, or as it is illustrated in this example, a "DRINK COLA" advertisement. The banner advertisement in companion content 1317 could include an interactive aspect such as a "learn more" or "buy now" buttons (not shown). Display window 1318 displays companion content 1319, a set of links to more information that may be of interest to the user of the media presentation. The links include a link to read a script of the movie, a link to view storyboards, and a link to closed captions.

In some embodiments, the channels can be closed by close channel buttons 1320. In some embodiments, some channel displays are closeable, but other channels cannot be closed by the user. For example, in some embodiments the main channel display window 1318 is closeable and the advertisement channel windows 1314 and 1316 are non-closeable.

FIG. 13B illustrates the companion content device 142 at a later time. The figure shows that the companion content displayed on one channel can be updated independently of the companion content on other channels. The figure includes time-offset 1350. Time-offset 1350 shows that the time-offset of the media presentation is at 00:03:00.

Time-offset 1350 (00:03:00) is the time-offset indicated in companion content program data 1312 as the time to update the main channel from multi-links companion content 1319 to the companion content 760 at Movdb.com/moviename-.htm. Accordingly, the companion content device 142 has performed download 240 to retrieve companion content 760 and is displaying companion content 760 in main channel display window 1318. The border around the corresponding URL in the companion content program data 1312 is thicker to indicate that it is the active URL. As for the personalized ad channel, the time-offset has not yet reached the time-offset associated with the second companion content item in the personalized ad display channel. In this embodiment, the channels update independently from each other. Therefore, the personalized ad channel display window 1314 still displays companion content 1315, even though the main channel display window 1318 has updated its display from companion content 1319 to companion content 760. Similarly, the time-offset has not yet reached the time-offset associated with the second companion content item in the banner ad display channel. Therefore, the banner ad channel display window 1316 still displays companion content 1317, even though the main channel display window 1318 has updated its display. The active companion content for the personalized ad channel and the banner ad channel are also shown by the thickened borders of the corresponding URLs in companion content program data 1312, which indicate that the first URLs of the personalized ad channel and the banner ad channel are active.

FIG. 13C shows the update of a second channel of companion content. The figure includes companion content 1327, time-offset 1360, and download 1370. Companion content 1327 includes a different banner ad than the banner ad in companion content 1317 in FIG. 13A. Time-offset 1360 shows that the time-offset of the media presentation is at 00:03:25. Download 1370 is a download of banner ad 1327.

At the time-offset 1360 (00:03:25), the companion content program data 1312 shows (via thickened border) that the banner ad channel has reached the time-offset (00:03:25) corresponding to the second companion content item of that channel. The companion content 1327 had been retrieved through download 1370. The companion content 1327 is displayed in banner ad channel display window 1316. As described above, each channel updates independently of the others. Accordingly, as the time-offset (00:07:00) for the second companion content of the personalized ad channel has not been reached (time-offset 1360 is 00:03:25, which is before 00:07:00), the personalized ad channel display window 1314 still displays companion content 1315. Similarly, as the time-offset (00:15:00) for the third companion content of the main channel has not been reached, the main channel display window 1318 still displays companion content 760.

In some embodiments, the sizes and positions of the display windows 1314, 1316, and 1318 are determined by additional data (not shown) in the companion content program data 1312. In some embodiments, the size and position of the display windows can change at different time-offsets, according to additional data (not shown) in the companion content program data rather than being set for the channel once and remaining at that setting through the playing of the media presentation. Yet in other embodiments, the user can maximize the size of each display window through maximize-channel buttons to display more information on the screen as described above in FIG. 13A.

Figure 14A:
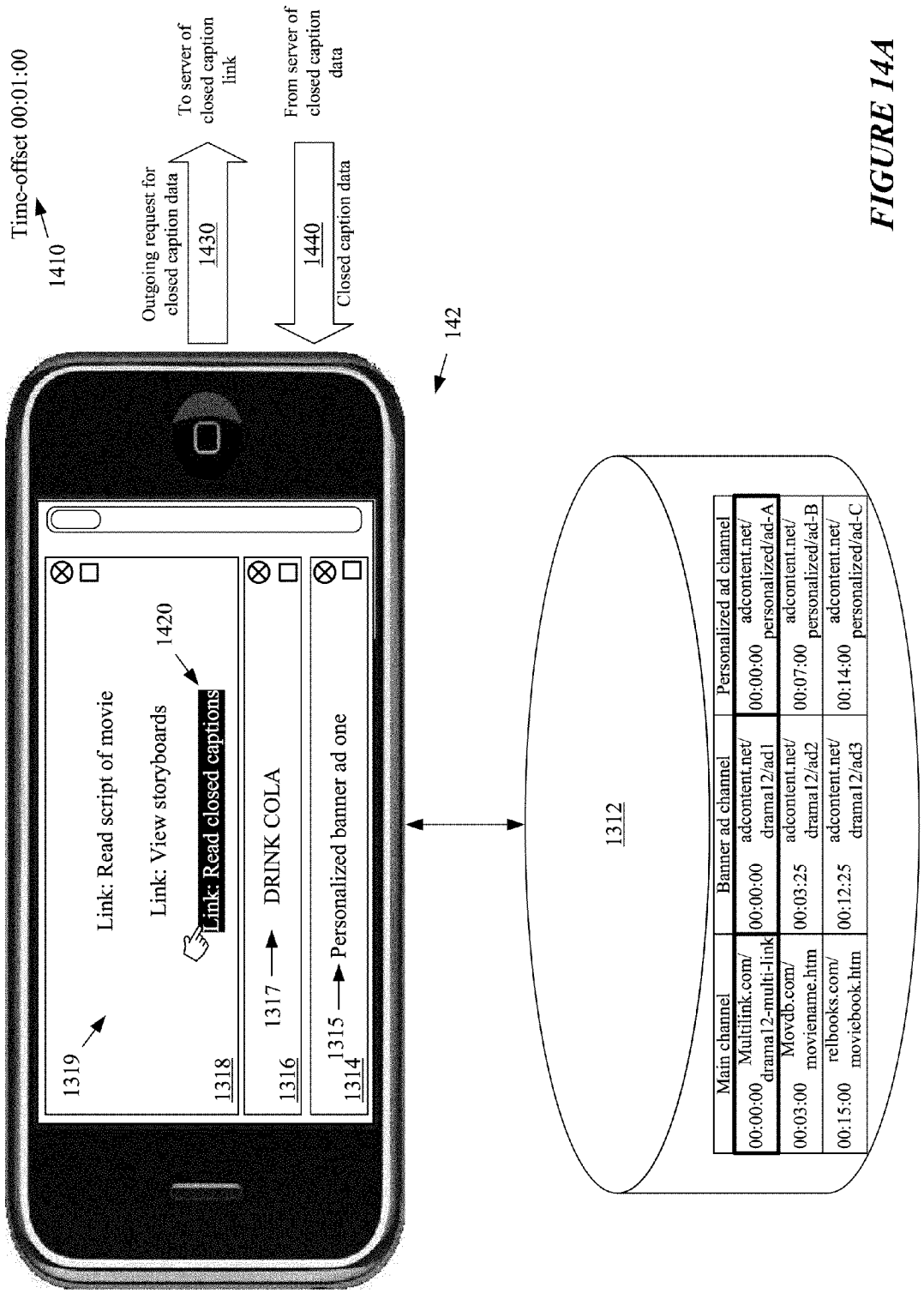
FIGS. 14A-14B illustrate different windows displaying different channels while a user interacts with companion content of one of the channels.
Figure 14B:
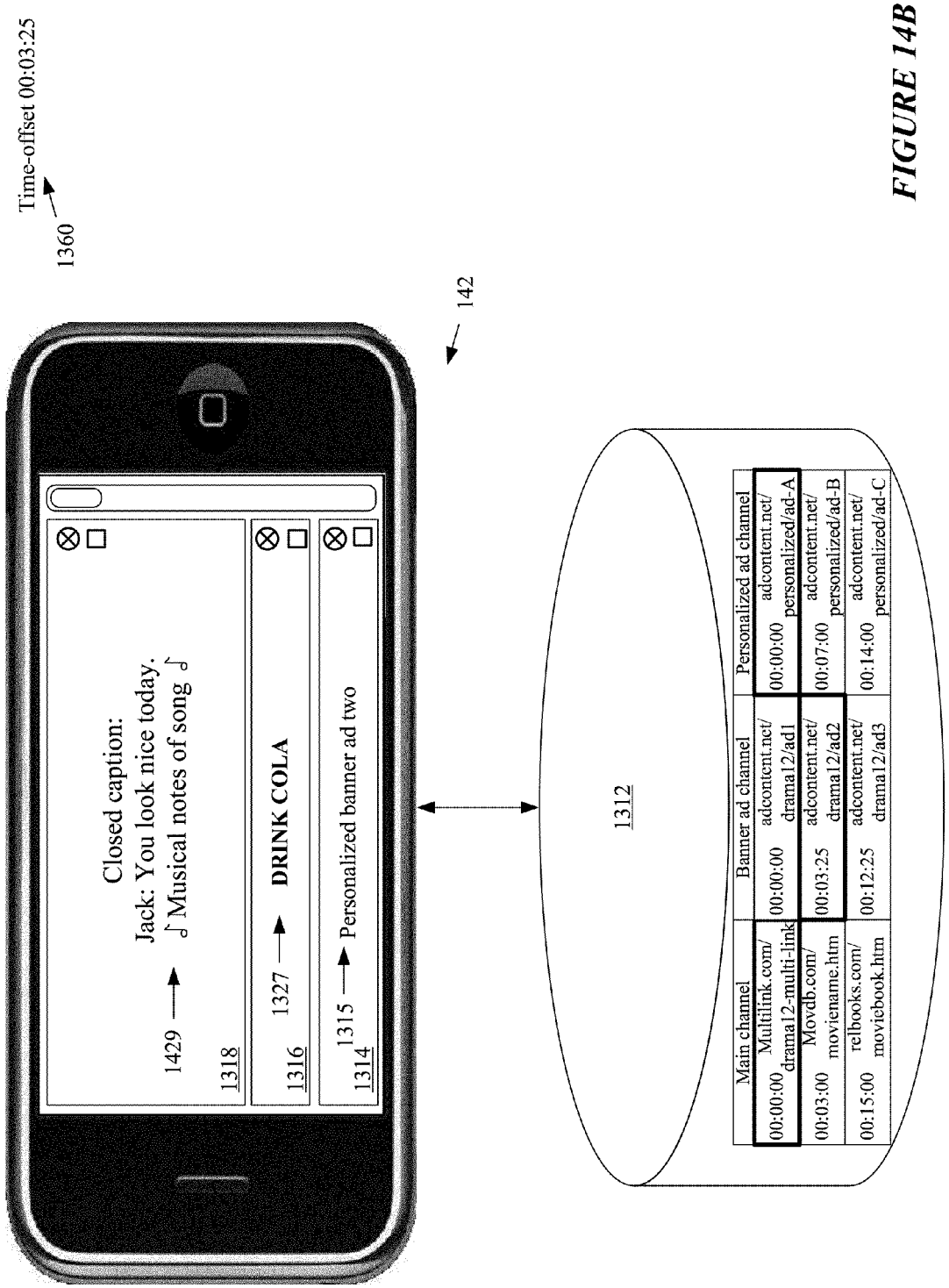

FIGS. 14A-14B illustrate different windows displaying different channels while a user interacts with companion content of one of the channels. FIG. 14A includes time-offset 1410, link 1420, data request 1430, and data transfer 1440. Time-offset 1410 is 00:01:00. Link 1420 is a link to downloadable closed captions. Data request 1430 is a request to download the closed captions from a URL embedded in link 1430. Data transfer 1440 is a transfer of closed caption data to the companion content device 142.

At time-offset 1410 (00:01:00) all channels in companion content program data 1312 are on their first items of companion content. The main channel displays companion content 1319 which includes a set of links. The link 1420 has been clicked by a user. As a result of that click, a data request 1430 for closed caption companion content has been sent to a server using a URL embedded in the link. In response to the data request 1430, the server has sent the closed caption companion content to the companion content device 142 through data transfer 1440. In some embodiments, the closed caption companion content is provided in a format that allows it to be displayed at time-offsets synchronized with the media presentation. That is, in some embodiments, the closed caption companion content associates each block of text in a closed caption file with a specific time-offset of the media presentations in a manner similar to the association of URLs with time-offsets in the companion content program data.

Some embodiments allow companion content to include actions to be performed at specific time-offsets synchronized with the media presentation. Two ways of allowing companion content to perform specific actions at specific times are described in the following two paragraphs with respect to the closed caption companion content. However, one of ordinary skill in the art will understand that the described methods of performing actions at time-offsets specified by an item of companion content at specific time-offsets is not limited to the display of closed captions, but is a feature that some embodiments provide to allow any item of companion content to perform actions at specific time-offsets.

The companion content device 142 of some embodiments performs specific actions at specific time-offsets determined by an item of companion content. In such embodiments, the companion content device 142 accesses the time-counter that it uses to track time-offsets and performs each action specified by the item of companion content at the time-offsets associated with that instruction in the item of companion content. For example, in such embodiments, the companion content device performs the action of displaying specific blocks of closed caption text at specified time-offsets.

In some embodiments, the companion content device allows companion content that includes plug-ins or applications. For example, in some embodiments, a closed caption companion content includes a reader application or plug-in that is designed to access the time-counter of the companion content device. In such embodiments, the application or plug-in displays each block of closed caption text at time-offsets associated with that block of text in the closed caption file. In some embodiments, while an item of companion content is providing time-offset based data, that companion content is treated as though the user is continuing to interact with it. For example, in some embodiments, once a closed caption display is started, it will continue to be displayed for the rest of the media presentation (unless the user deactivates it), overriding later scheduled items in the same channel.

FIG. 14B includes closed caption display 1429. Closed caption display 1429 displays closed captions for the media presentation (not shown). At time-offset 1360 (00:03:25), the second companion content of the main channel in companion content program data 1312 has been reached (00:03:25 is after 00:03:00). However, because the closed caption link was clicked (as shown in FIG. 14A), and the closed caption display is treated as an ongoing interaction, the main channel has not moved on to display the second companion content item in companion content program data 1312. That is, the main channel display window 1318 is showing the closed captions display 1429 instead of the content scheduled for the main channel at time-offset 1360.

At the time-offset 1360 (00:03:25), the companion content program data 1312 shows that the banner ad channel has reached the time-offset corresponding to the second banner advertisement at (at URL example.net/drama12/ad2). If the closed captions 1429 were on the same channel as banner ad 1315, then some embodiments would continue to show the closed captions 1429 instead of switching to banner ad of companion content 1315 because (in those embodiments) user interaction overrides the companion content program data. However, the closed captions 1429 and banner ad of companion content 1315 are on different channels. The separate display windows for the separate channels allow the companion content device 142 to still have areas where it continues to display time specific content, under (or over or around in some embodiments) the main channel display window 1318. Therefore, the banner ad of companion content 1315 is displayed in the banner ad channel display window 1314 at the same time as the closed captions 1429 are displayed in the main channel display 1318.

One of ordinary skill in the art will realize that the specific companion content channels illustrated herein are not an exhaustive list of possible channels within the scope of some embodiments. Other channels are possible within the scope of some embodiments. For example, some embodiments include a channel that displays a copy of the main media program that is streamed to the companion content device or cached on the companion content device. In some embodiments, the copy is broadcast from the media player. In other embodiments, the copy is received over a network. The copy allows the user to keep watching the program while looking at the companion content device.

Different embodiments encode the data in different ways to display multiple channels of companion content. For example, in some embodiments, each entry in the list of companion data indicates what channel it belongs to, and the corresponding time-offset and URL. Table 3, below, shows an example of pseudocode for such data encoding of displaying multiple channels of companion content.

TABLE 3

```
<content>
time, channel, URL
time, channel, URL
time, channel, URL
</content>
```

Some other embodiments encode the data differently. In some such embodiments, each entry in the list of companion data consists of multiple columns. Each column is allocated to a different channel. Each entry in the channel column will then indicate the time-offset and the URL that belong to that channel. The companion content program data 1312 illustrated in FIGS. 13A-14B is an example of this type of encoding. Table 4, below, shows an example of pseudocode for such data encoding of displaying multiple channels of companion content.

TABLE 4

```
<content>
<channel1>
time, URL
time, URL
</content>
</channel1>
<channel2>
time, URL
time, URL
</channel2>
</content>
```

While the above described embodiments include channels that are opened according to companion content program data, one of ordinary skill in the art will understand that in some embodiments, channels can be opened and/or closed in response to user interaction (in addition to or instead of opening channels based on the companion content program data). In some embodiments, selecting a link results in the replacement of the channel that the link was in with a channel that contains data specified by the link. In some embodiments, the new channel is added to the existing channels, rather than replacing an existing channel of companion content.

New channels are opened, for instance, by the selection of the links that refer to content that is not directly referenced in the companion content program data in some embodiments. For example, in some such embodiments, rather than being opened automatically while the media presentation is playing, channels associated with script data, storyboards, and/or closed captions are opened if and when the user selects these items of content. In some embodiments, when the user selects any of these types of content which do not initially have open channels dedicated to them, the links used to select these types of content provide a URL (e.g., additional metadata) that indicates to the companion content device that the data from the URL should be loaded and interpreted as a companion content data channel, either adding a new channel of program data or replacing an existing channel. Furthermore, some embodiments include an "add window" option for a window that can be opened or closed without selecting a specific link before opening the new window.

VII. Transport Controls

Figure 15:
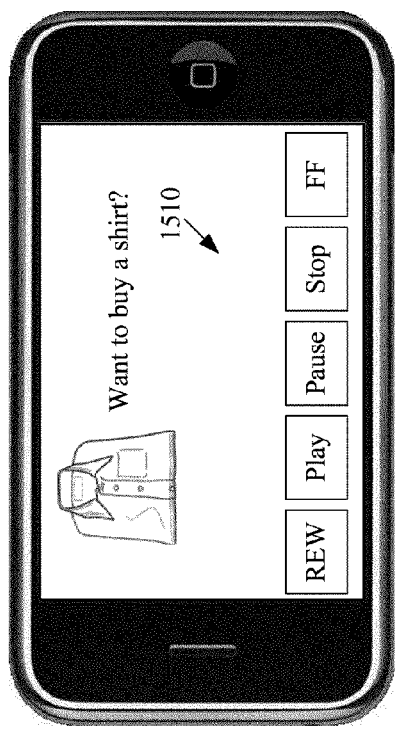
FIG. 15 illustrates a companion content device with user interface controls of some embodiments.

In some embodiments, at least some companion content devices include the ability to transmit commands to the media player. In some embodiments these commands are carried by an infra-red (IR) signal. In some embodiments these commands are carried by a wireless (radio) signal. In some embodiments, the companion content device includes user interface controls for sending commands to the media player. FIG. 15 illustrates a companion content device with user interface controls of some embodiments. The figure includes transport controls 1510. Transport controls 1510 include a stop icon, a pause icon, a rewind icon, a fast forward icon and a play icon. In the illustrated embodiment, the transport controls 1510 are constantly present in a bar along one side of the companion content device display while content is being shown. When one of the controls is activated the companion content device sends out a signal corresponding to that control.

Figure 16:
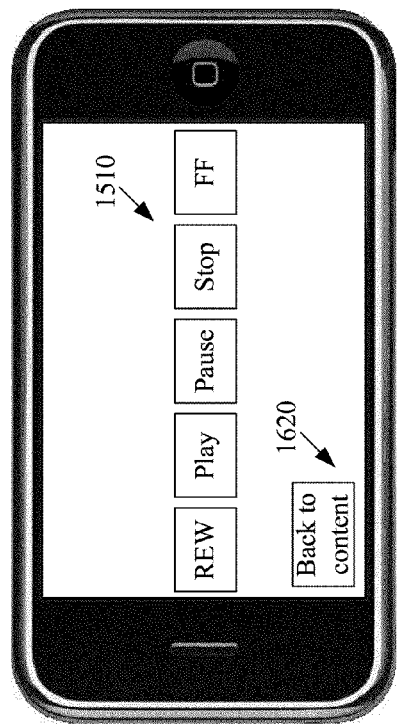
FIG. 16 illustrates a companion content device with hidden user interface controls of some embodiments.
Figure 16:
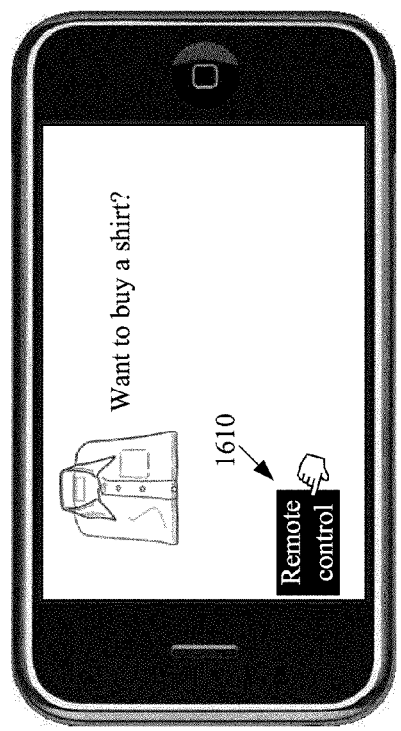

FIG. 16 illustrates a companion content device with hidden user interface controls of some embodiments. The figure includes remote control icon 1610 and back to content icon 1620. In the illustrated embodiment, the transport controls 1510 are hidden until a user selects the remote control icon 1610. Once the remote control icon 1610 has been selected, the transport controls 1610 are displayed and the usual content is hidden. After the remote control icon 1610 is selected, along with the transport controls 1510, the companion content device displays the back to content icon 1620. When the back to content icon 1620 is selected, the companion content device returns to the previous state with the content shown and the transport controls 1510 not shown.

Figure 17:
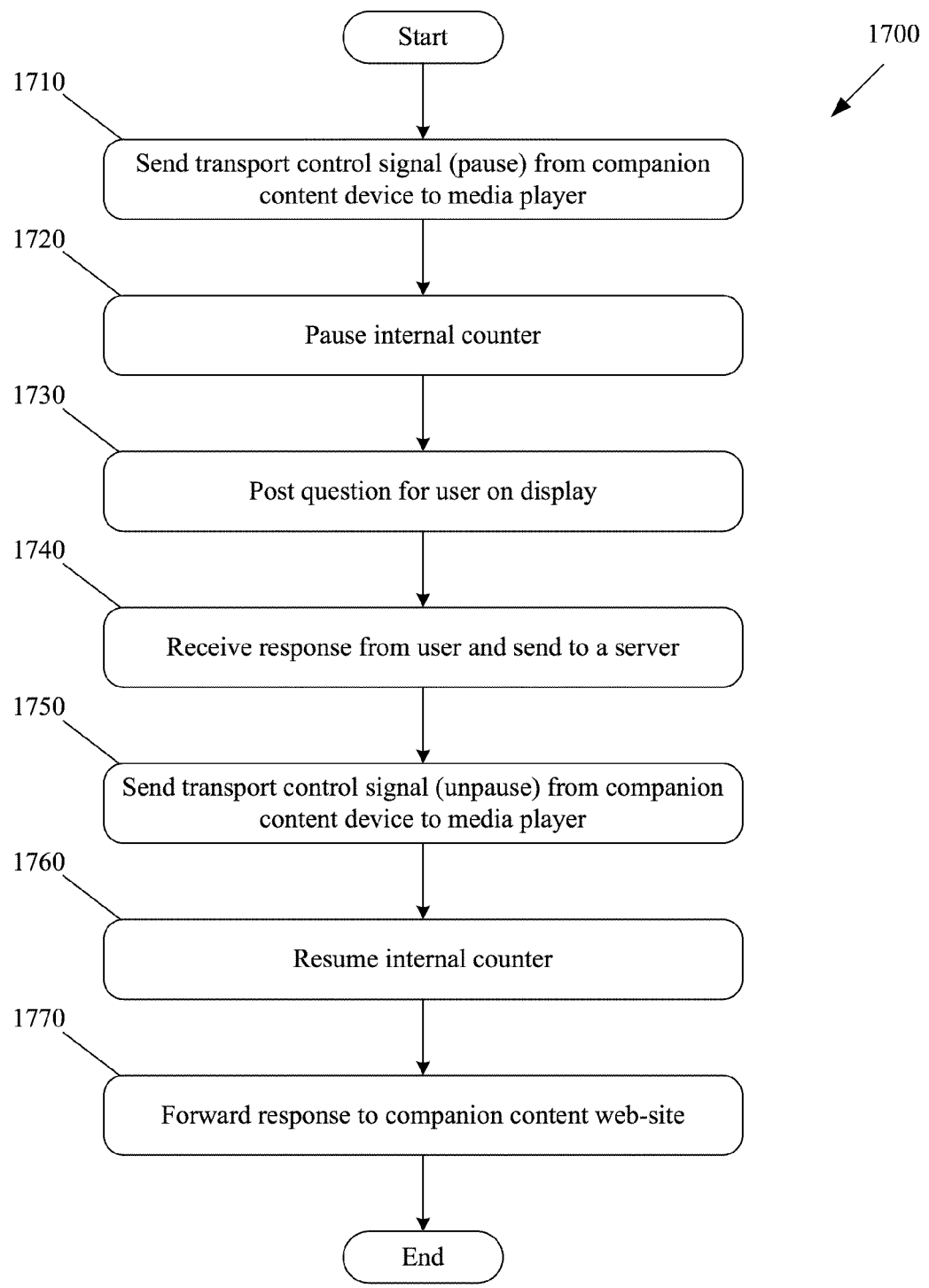
FIG. 17 illustrates a process of some embodiments for content on the companion content device to pause a media player while awaiting a response from a user of the companion content device.

In some embodiments, the companion content device issues transport commands as directed by the companion content. FIG. 17 illustrates a process 1700 of some embodiments in which an item of companion content controls the media player. The process 1700 pauses the presentation in order to allow the user to answer a question on the companion content device. The process sends (at 1710) a transport control signal from the companion content device to the media player. The transport control signal commands the media player to pause the media presentation. In some embodiments, the transport control signal can be sent over IR, wireless communications, or wired communications. Some embodiments provide companion content devices and media players that can use more than one type of signal for the transport control signal. The process then pauses (at 1720) the internal counter of the companion content device.

In some embodiments, the process does not pause the counter directly after sending the transport control signal to pause, but instead pauses the counter after receiving a signal from the media player indicating that the presentation has paused. In some embodiments, the pause signal is sent (at 1710) repeatedly until the media player acknowledges that the media presentation has paused. The companion content device then displays (at 1730) a question for the user. For example, the question could be who to vote for in a reality TV show. The question could also be an academic question based on the media presentation so far. The process receives (at 1740) a response from the user and the companion content device sends the user's selection to a remote server through a URL specified in the companion content. In some embodiments, the user's selection is sent to a local server on the media player device instead of a remote server in order for the information to be collected and processed locally. The process of some embodiments, in addition to the user's selection, sends other information to the remote or local server to be processed. Such information, for instance, in some such embodiments can include the identity information of the user (e.g., for a voting scenario in which there are a limited numbers of votes per user).

Once a response has been received, the process then allows the media presentation to continue. The process sends (at 1750) a transport signal to the media player to resume playing. The process then resumes (at 1760) the counting of the time-offset counter. In some embodiments, the process waits for confirmation from the media player that the media presentation has resumed before the process resumes the counting of the time-offset counter. The process then forwards (at 1770) the user's response to the companion content web-site. The process then ends.

In some embodiments, the process treats the user's response in a different manner. For example, in some embodiments, the process stores the user's response locally. Storing the response locally could be used when the user is trying to test himself, such as by playing along with a quiz show. Some embodiments store or send the response as directed by the companion content. Furthermore, in some embodiments, instead of one companion content device asking one user a question, multiple companion content devices of multiple users (all watching the same media presentation) ask their respective users a question. In such embodiments, multiple users respond (at 1740). In some such embodiments, the transport controls are handled democratically. The media player resumes the presentation once some percentage of the companion content devices present have received a response. Some embodiments provide a media player that can detect the number of companion content devices present in order to determine the percentage of users that have responded. In other embodiments, with a media player that can't count votes, but with companion content devices that are capable of communicating with each other, the companion content on each companion content device communicates with the companion content on the other companion content devices to determine when the threshold percentage has been reached. Then one of the companion content devices is designated to send the transport commands to the media player.

VIII. Software Architecture

Some embodiments implement the functions described above through software stored on computer readable media. The media players of some embodiments and the companion content devices of some embodiments include software that has various modules. The software modules of some embodiments are described below.

Figure 18:
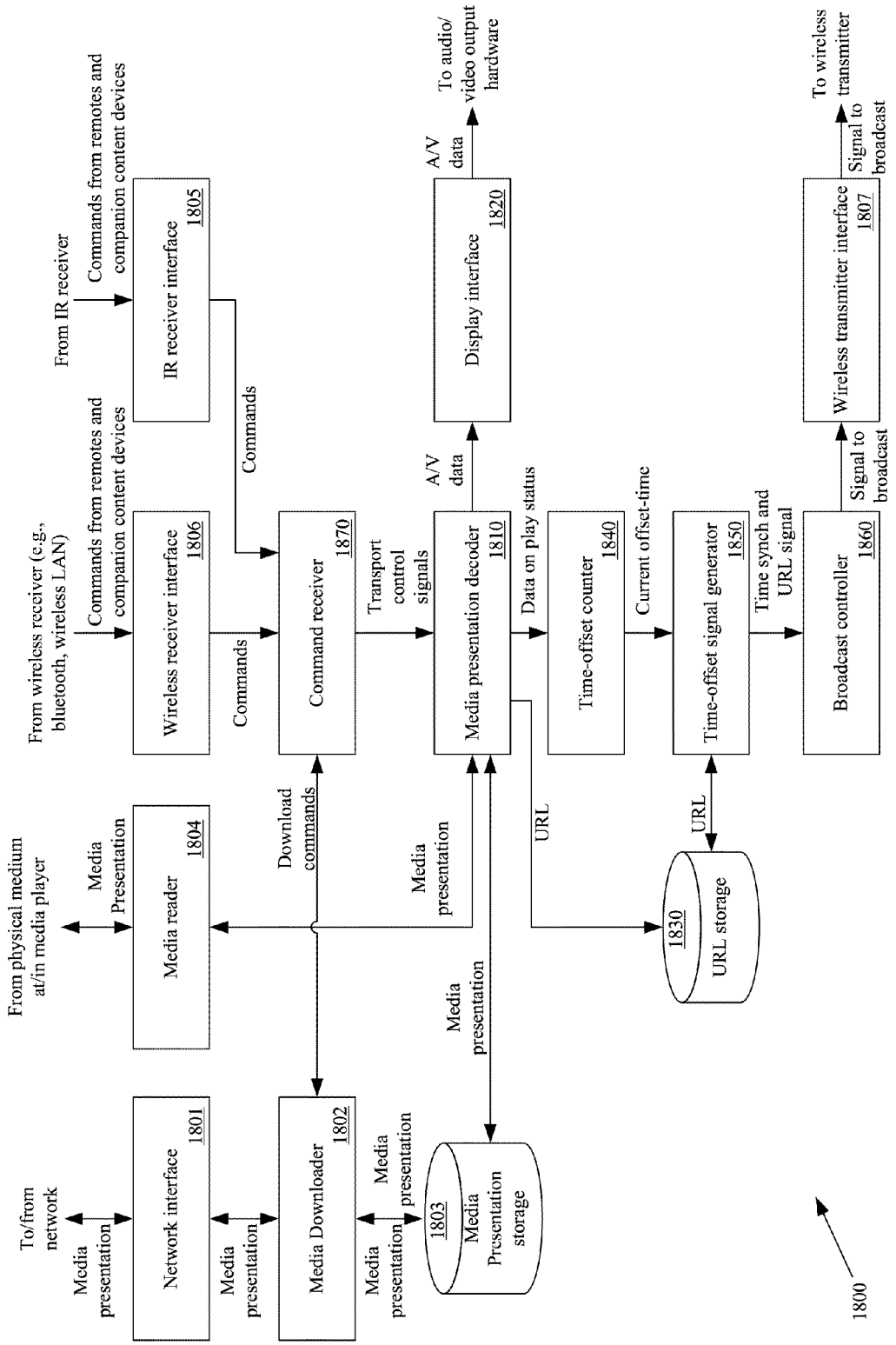
FIG. 18 conceptually illustrates a software architecture diagram of a media player of some embodiments.

FIG. 18 conceptually illustrates a software architecture diagram 1800 of a media player of some embodiments. The diagram shows functions of the media player of some embodiments, and types of data that the media player sends and receives in some embodiments. The diagram 1800 includes a network interface 1801, a media downloader 1802, a media presentation storage 1803, a media reader interface 1804, an IR receiver interface 1805, a wireless receiver interface 1806, and a wireless transmitter interface 1807, a media presentation decoder 1810, a display interface 1820, a URL storage 1830, a time-offset counter 1840, a time-offset signal generator 1850, a broadcast controller 1860 and a command receiver 1870.

The network interface 1801 connects the media player to the network (through network hardware, not shown). The media downloader 1802 uses the network interface 1801 to connect to servers that store media presentations and downloads the media presentations. The media presentation storage 1803 stores the media presentations downloaded from the servers. Some embodiments include a media reader interface 1804 for a media reader that reads tangible media such as DVDs, CDs, or Blu-ray® disks. The IR receiver interface 1805 receives commands from infra-red remote controls including companion content devices with infra-red transmitters. The wireless receiver interface 1806 receives commands from wireless controllers (e.g., through Bluetooth or wireless LAN). The wireless transmitter interface 1807 broadcasts signals to nearby wireless receivers (e.g., to companion content devices). The media presentation decoder 1810 receives media presentation data from the media presentation storage 1803 and/or from the media reader interface 1804. The media presentation decoder 1810 decodes the media presentation data and sends the decoded data to the display interface 1820. The display interface 1820 receives the decoded information from the media presentation decoder 1810 and passes it to the display through whatever hardware (not shown) connects the display to the media player. The media presentation decoder 1810 also provides the current time-offset to the time-offset counter 1840.

The media presentation decoder 1810 also extracts URLs from the media presentations and sends the URLs to the URL storage 1830. The URL storage 1830 receives the URLs from the media presentation decoder 1810. The URL storage 1830 provides the URL to the time-offset signal generator 1850 so that the URL can be included in the time synchronization signals sent out by the media player. The media presentation decoder of some embodiments extracts a media ID (i.e., a unique identifier for the media item) from the media presentation. In some such embodiments, the media player always checks one or more program directory servers to see if there is a new URL that should be used for the media currently being played. This would enable a level of flexibility that would allow the media player to be configured with the companion content directory server. In some such embodiments, when a new media item is selected, the media player would get the media ID and send a query to the directory server with that media ID. Sending the media ID constitutes a request for the URL at which the companion content program data associated with that media ID can be found. Then the companion content is requested via the URL that was supplied by the directory server. In short, in such embodiments, the media player retrieves, from a program directory server, the URL that the media player then broadcasts to the companion content device, rather than retrieving that URL from the media item directly.

The time-offset signal generator 1850 receives data identifying the current time-offset from the time-offset counter 1840. In some embodiments, the time-offset signal generator then encodes the time-offset from the time-offset counter 1840 and the URL from the URL storage 1830 into a coded signal. In some embodiments, the coded signal is similar to the coded signal shown in Table 1, above. In some other embodiments, the time synchronization signal and the URL are encoded and sent separately. The time-offset signal generator 1850 then passes the encoded signal to the broadcast controller 1860, which passes the encoded signal to the broadcast hardware (not shown) through wireless transmitter 1807. The encoded signal is then broadcast to the companion content devices in proximity to the media player. In some embodiments, the media presentation decoder 1810 receives transport control signals from the command receiver 1870. The command receiver 1870 in some embodiments receives commands from the user through one or more interfaces, such as the wireless receiver interface 1806 and the IR receiver interface 1805. In some embodiments, the same IR receiver that receives IR signals from remote controls also receives IR signals from companion content devices with IR transmitters.

After the IR or wireless signals are received by the wireless receiver interface 1806 or the IR receiver interface 1805, they are passed to a command receiver 1870 to determine what the commands mean in the context of the present state of the media player. Some commands are sent from the command receiver 1870 to the media presentation decoder 1810 to control the playing of a presentation. Other commands are sent to the media downloader 1802 to command it to order a new presentation from a server through the network interface 1801. The commands include, but are not limited to "play", "stop", "pause", skip to next/previous chapter, "fast forward" and "rewind". In some embodiments, the command receiver 1870 can get these commands from the user through one or more of an external remote control, controls on the media player itself, or a companion content device. In some embodiments, the network interface 1801 communicates with the network through a wireless transmitter and a wireless receiver. In some embodiments, the same wireless receiver interface and transmitter interface that receive and transmit signals from/to the companion content devices are used as the network interface 1801.

Figure 19:
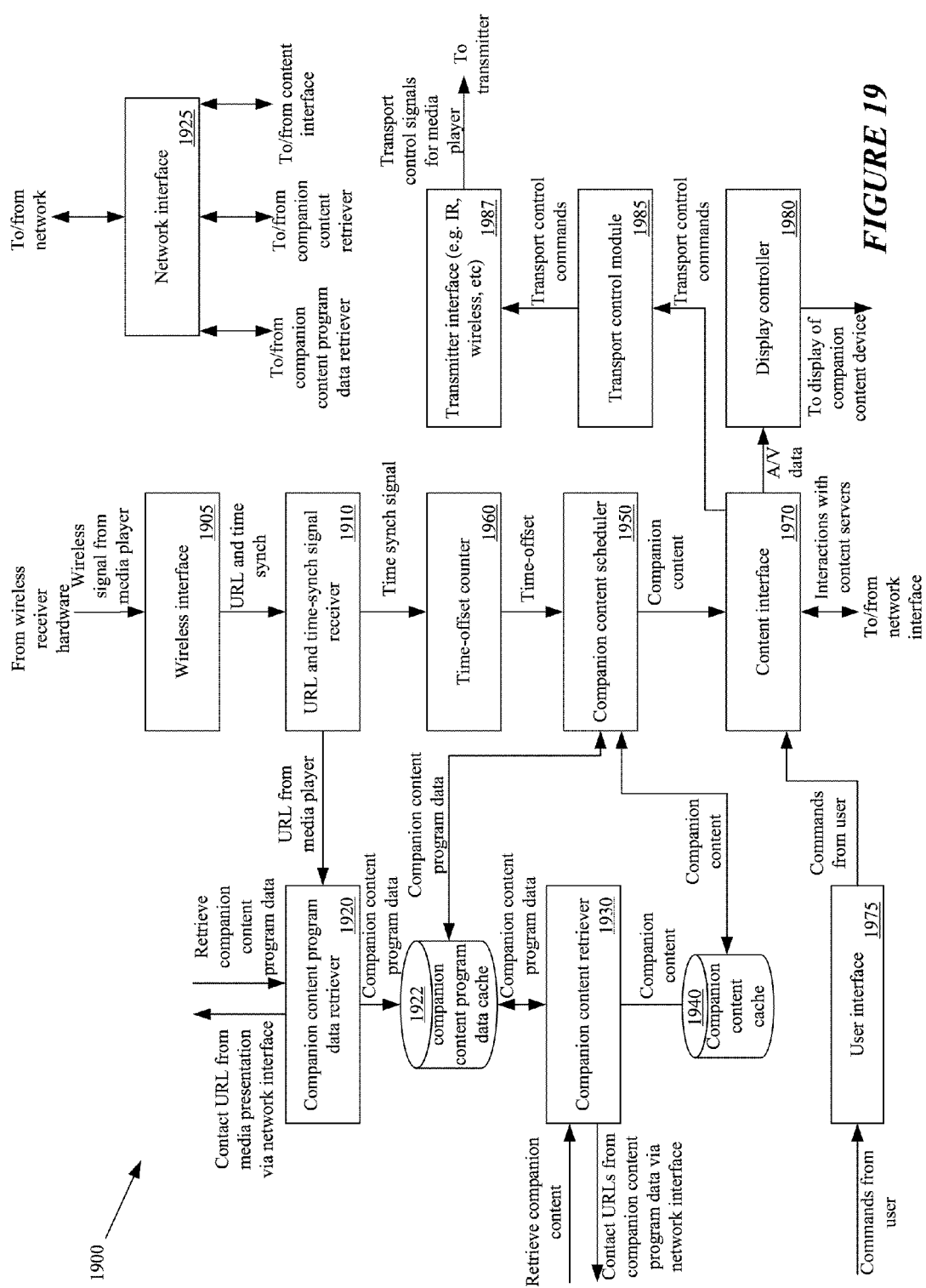
FIG. 19 conceptually illustrates a software architecture diagram of a companion content device of some embodiments.

FIG. 19 conceptually illustrates a software architecture diagram 1900 of a companion content device of some embodiments. The diagram shows some of the functions of the companion content device and some of the types of data that the companion content device sends and receives. The architecture diagram 1900 includes wireless interface 1905, URL and time-synchronization signal receiver 1910, companion content program data retriever 1920, companion content program data cache 1922, network interface 1925, companion content retriever 1930, companion content cache 1940, companion content scheduler 1950, time-offset counter 1960, content interface 1970, user interface 1975, display controller 1980, transport control module 1985, and transmitter interface 1987.

The wireless interface 1905 receives signals from a media player. The signals contain the URL for the companion content program data of the media presentation being played by the media player and a time synchronization signal encoded in the wireless transmission. The wireless interface 1905 decodes the signals into electronic data and passes the electronic data to the URL and time-synch signal receiver 1910. The signal receiver 1910 receives the URL signals and time-synchronization signals from the wireless interface and passes the signals to the appropriate modules. The signal receiver 1910 passes the URL to the companion content program data retriever 1920. The companion content program data retriever 1920 contacts the URL that was received from the media player to download the companion content program data. In some embodiments, the companion content program data retriever 1920 contacts the specified URL through the network interface 1925. In some embodiments, the network interface 1925 controls one or more wireless transmitters and receivers such as Bluetooth, cellular phone technology, or wireless LAN signals. In some embodiments the network interface 1925 uses wired hardware, such as Ethernet, to connect to the network. In some embodiments, the wireless interface 1905 and the transmitter interface 1987 are part of the network interface 1925, or the network interface 1925 is used instead of one or both of the wireless interface 1905 and the transmitter interface 1987. In other embodiments, different network interfaces are used for different tasks such as downloading companion content program data, downloading companion content, and controlling the media player.

The companion content program data retriever 1920 passes the companion content program data to the companion content program data cache 1922. The companion content program data cache 1922 provides (upon request) the companion content program data to the companion content retriever 1930 and to companion content scheduler 1950.

In some embodiments, the companion content retriever 1930 downloads and caches the content identified in the companion content program data once the retriever 1920 receives the companion content program data. Some embodiments download the companion content shortly before it is needed, or some set amount of time before it is needed. The companion content retriever of some embodiments downloads the companion content through the network interface 1925. The companion content retriever sends the downloaded companion content to the companion content cache 1940. The companion content cache 1940 stores the companion content until it is needed.

When an item of companion content is needed (e.g., when the time-offset of the media presentation matches the time-offset associated with the item of companion content by the companion content program data) the companion content scheduler 1950 retrieves the companion content from the companion content cache 1940. The companion content scheduler 1950 identifies the times when particular items of companion content are needed by comparing the time-offsets in the companion content program data received from the companion content program data cache 1922 with the time-offset received from the time-offset counter 1960. The time-offset counter 1960 receives synchronization signals from the media player through the wireless interface 1905 and the signal receiver 1910. Synchronization is further described as part of section III, above.

The companion content scheduler 1950 sends the content to the content interface 1970 when that item of content is needed. The content interface 1970 receives the content from companion content scheduler 1950 and sends the audio and visual parts of the companion content to the display controller 1980. The display controller 1980 controls the electronic visual and audio display of the companion content device. The display controller 1980 passes the signals from the content interface to the display and speakers/headphone jack of the companion content device. In some embodiments, the display controller 1980 only handles visual data and a separate controller is used for audio data.

The content interface 1970 also handles user interaction with the content. When the images of the companion content are on the display of the companion content device, the user can interact with the companion content. The content interface 1970 receives these interactions from a user interface that interprets user commands (e.g., taps, clicks, etc.) from a user. The content interface 1970 passes the user commands and any other interactive signals to the network interface 1925 for any further network communication if necessary (e.g., when a "buy now" button is clicked). In some embodiments, the user commands may result in further network communication to complete a task. For example, further network communication would be used to execute a one-click purchase via an HTTP request and response.

When the user commands received by the user interface 1975 are intended to control the media player, or when an item of companion content needs to control the media player (e.g., pausing the presentation to ask the user a question), the content interface 1970 passes the commands to the transport control module 1985. The transport control module 1985 then sends the commands to the media player through a transmitter interface 1987. In some embodiments, the transmitter interface 1987 controls an IR transmitter. In some embodiments, the transmitter interface 1987 controls a wireless transmitter such as Bluetooth or a wireless LAN. In some embodiments, separate transmitter interfaces are provided for each type of IR or wireless transmission. In some embodiments, the transmitter interface uses the same transmitter as the network interface 1925. Some embodiments use the network interface 1925 to send transport control commands to the media player rather than providing a separate transmitter interface 1987. While Bluetooth and wireless LAN transmissions have been provided as an example of wireless transmissions, one of ordinary skill in the art will realize that in some embodiments, any type of wired or wireless communication can be used instead.

While many of the features described in relation to FIGS. 18 and 19 have been described as being performed by one module, one of ordinary skill in the art will recognize that the functions described herein might be split up into multiple modules. Similarly, functions described as being performed by multiple different modules might be performed by a single module in some embodiments (e.g., the scheduling and report generation functions). Also, in some embodiments, as mentioned before, the media player and the companion content device could both operate on the same machine (e.g. different applications or subsystems of the same application would run on one machine).

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface (FIGS. 8-11). However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

IX. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more electronic systems, define one or more specific machine implementations that execute and perform the operations of the software programs.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 may include, but is not limited to a bus 2005, processing unit(s) 2010, a graphics processing unit (GPU) 2020, a system memory 2025, a network 2065, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2020, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments. Some instructions are passed to and executed by the GPU 2020. The GPU 2020 can offload various computations or complement the image processing provided by processing unit(s) 2010. In some embodiments, such functionality can be provided using CoreImage's kernel shading language.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. For example, the various memory units include instructions for processing multimedia clips in accordance with some embodiments. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2065 through a network adapter (not shown). In this manner, the electronic can be a part of a network of computers (such as a local area network ("LAN"), a wide area network ("WAN"), or an Intranet, or a network of networks, such as the internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 4, 5, 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method of interacting with a media player through a companion content device, the method comprising:
    receiving content data related to content to be displayed at a particular time in a media presentation, wherein the content data comprises a question;
    in response to the received content data, sending, from the companion content device, a first transport control signal to the media player to pause the media presentation at the particular time;
    displaying the question on the companion content device;
    receiving a response to the question at the companion content device; and
    sending, from the companion content device, a second transport control signal to the media player to resume the media presentation.

2. The method of claim 1, wherein the media presentation is displayed on a display separate from the companion content device.

3. The method of claim 1, wherein received content data further comprises a command to be performed by the companion content device.

4. The method of claim 3, wherein the command comprises instructions received over the Internet.

5. The method of claim 1 further comprising:
    before receiving the response, pausing an internal counter of the companion content device; and
    after receiving the response, unpausing the internal counter of the companion content device.

6. The method of claim 1 further comprising sending the response to a server.

7. The method of claim 6, wherein the server is a remote server.

8. A system for delivering companion content during a media presentation, the system comprising:
    a media player for displaying the media presentation;
    a plurality of companion content devices, each companion content device for:
        providing a question, wherein the question prompts participation in an activity related to the content being displayed;
        receiving responses to the question; and
        communicating with other companion content devices to determine whether at least a threshold percentage of the companion content devices have responded to the question, wherein at least one companion content device among the plurality of companion content devices sends a transport control signal to the media player to resume the media presentation when the threshold percentage of companion content devices have responded to the question.

9. The system of claim 8 wherein the companion devices communicate with other companion content devices by sending and receiving signals among the companion content devices to determine when the threshold percentage of responses has been received.

10. The system of claim 8, wherein the media player is further for detecting the number of companion content devices present in order to determine the threshold percentage.

11. The system of claim 8, wherein the companion content devices are further for sending the received responses to a server.

12. The system of claim 8, wherein the companion content devices are further for sending the received responses to a server.

13. The system of claim 8 further comprising, wherein:
    the transport control signal is a first transport control signal;
    a particular companion content device of the plurality of companion content devices is further for sending a second transport control signal to pause the media presentation before each companion content device provides the question; and
    each companion content device is further for:
        pausing an internal counter; and,
        unpausing the internal counter after the first trans ort control signal to resume the media presentation is sent to the media player.

14. A non-transitory machine readable medium storing a program, which when executed by at least one processing unit of a companion content device interacts with media player separate from the companion content device that provides a media presentation to an electronic display separate from the companion content device, the program comprising sets of instructions for:
    receiving content data related to content to be displayed at a particular time in the media presentation, wherein the content data comprises a question;
    sending, in response to the received content data, from the companion content device, a first transport control signal to the media player to pause the media presentation at the particular time;
    receiving, at the companion content device, a response to a question displayed on the electronic display, wherein the question prompts participation in an activity related to the content being displayed; and
    sending, from the companion content device, a second transport control signal to the media player to resume the media presentation.

15. The non-transitory machine readable medium of claim 14, wherein the question is also displayed on the companion content device.

16. The non-transitory machine readable medium of claim 14, wherein the first transport control signal from the companion content device is sent automatically in response to a command from an item of companion content on the companion content device.

17. The non-transitory machine readable medium of claim 16, wherein the item of companion content comprises instructions received from an Internet site.

18. The non-transitory machine readable medium of claim 14, wherein the program further comprises sets of instructions for:
    pausing, before receiving the response, an internal counter of the companion content device; and
    unpausing, after receiving the response, the internal counter of the companion content device.

19. The non-transitory machine readable medium of claim 14, further comprising a set of instructions for sending the response to a server, wherein the server is a local server on the media player.

\* \* \* \* \*